US006728871B1

(12) United States Patent
Vorbach et al.

(10) Patent No.: US 6,728,871 B1
(45) Date of Patent: Apr. 27, 2004

(54) RUNTIME CONFIGURABLE ARITHMETIC AND LOGIC CELL

(75) Inventors: Martin Vorbach, München (DE); Robert Münch, Karlsruhe (DE)

(73) Assignee: PACT XPP Technologies AG, Munich (DE)

( * ) Notice: Subject to any disclaimer, the term of this patent is extended or adjusted under 35 U.S.C. 154(b) by 0 days.

(21) Appl. No.: 09/329,132

(22) Filed: Jun. 9, 1999

Related U.S. Application Data

(63) Continuation of application No. PCT/DE97/02949, filed on Dec. 9, 1997, and a continuation-in-part of application No. 08/946,810, filed on Oct. 8, 1997, now Pat. No. 6,425,068.

(51) Int. Cl.[7] .......... G06F 15/16

(52) U.S. Cl. .......... 712/226; 712/17; 712/20

(58) Field of Search .......... 712/227, 226, 712/209, 10–22

(56) References Cited

U.S. PATENT DOCUMENTS

| | | | |
|---|---|---|---|
| 3,855,577 A | * 12/1974 | Vandierendonck | 713/324 |
| 4,591,979 A | 5/1986 | Iwashita | |
| 4,706,216 A | 11/1987 | Carter | |
| 4,739,474 A | 4/1988 | Holsztynski | |
| 4,761,755 A | 8/1988 | Ardini et al. | |
| 4,811,214 A | 3/1989 | Nosenchuck et al. | |
| 4,852,048 A | 7/1989 | Moton | |
| 4,870,302 A | 9/1989 | Freeman | |
| 4,901,268 A | 2/1990 | Judd | |
| 4,967,340 A | 10/1990 | Dawes | |
| 5,014,193 A | 5/1991 | Garner et al. | |
| 5,015,884 A | 5/1991 | Agrawal et al. | |
| 5,021,947 A | 6/1991 | Campbell et al. | |
| 5,023,775 A | 6/1991 | Poret | |
| 5,043,978 A | 8/1991 | Nagler et al. | |
| 5,081,375 A | 1/1992 | Pickett et al. | |

(List continued on next page.)

FOREIGN PATENT DOCUMENTS

| | | |
|---|---|---|
| DE | 4416881 | 5/1993 |
| DE | 19654595 | 7/1998 |
| DE | 19654846 | 7/1998 |

(List continued on next page.)

OTHER PUBLICATIONS

Bittner, Ray, A., Jr., Wormhole Run–Time Resonfiguration: Conceptualization and VLSI Design of a High Performance Computing System:, Dissertation, Jan. 23, 1997, pp. i–xx, 1–415.

(List continued on next page.)

*Primary Examiner*—Richard L. Ellis
(74) *Attorney, Agent, or Firm*—Kenyon & Kenyon

(57) ABSTRACT

A cascadable arithmetic and logic unit (ALU) which is configurable in function and interconnection. No decoding of commands is needed during execution of the algorithm. The ALU can be reconfigured at run time without any effect on surrounding ALUs, processing units or data streams. The volume of configuration data is very small, which has positive effects on the space required and the configuration speed. Broadcasting is supported through the internal bus systems in order to distribute large volumes of data rapidly and efficiently. The ALU is equipped with a power-saving mode to shut down power consumption completely. There is also a clock rate divider which makes it possible to operate the ALU at a slower clock rate. Special mechanisms are available for feedback on the internal states to the external controllers.

19 Claims, 23 Drawing Sheets

U.S. PATENT DOCUMENTS 5,109,503 A 4/1992 Cruickshank et al.
5,113,498 A 5/1992 Evan et al.
5,115,510 A 5/1992 Okamoto et al.
5,123,109 A 6/1992 Hillis
5,125,801 A 6/1992 Nabity et al.
5,128,559 A 7/1992 Steele
5,142,469 A 8/1992 Weisenborn
5,204,935 A 4/1993 Mihara et al.
5,208,491 A 5/1993 Ebeling et al.
5,226,122 A 7/1993 Thayer et al.
RE34,363 E 8/1993 Freeman
5,233,539 A 8/1993 Agrawal et al.
5,247,689 A 9/1993 Ewert
5,287,472 A 2/1994 Horst
5,301,344 A 4/1994 Kolchinsky
5,303,172 A 4/1994 Magar et al.
5,336,950 A 8/1994 Popli et al.
5,361,373 A 11/1994 Gilson
5,418,952 A 5/1995 Morley et al.
5,421,019 A 5/1995 Holsztynski et al.
5,422,823 A 6/1995 Agrawal et al.
5,426,378 A 6/1995 Ong
5,430,687 A 7/1995 Hung et al.
5,440,245 A 8/1995 Galbraith et al.
5,440,538 A 8/1995 Olsen et al.
5,442,790 A 8/1995 Nosenchuck
5,444,394 A 8/1995 Watson et al.
5,448,186 A 9/1995 Kawata
5,455,525 A 10/1995 Ho et al.
5,457,644 A 10/1995 McCollum
5,473,266 A 12/1995 Ahanin et al.
5,473,267 A 12/1995 Stansfield
5,475,583 A 12/1995 Bock et al.
5,475,803 A 12/1995 Stearns et al.
5,483,620 A 1/1996 Pechanek et al.
5,485,103 A 1/1996 Pedersen et al.
5,485,104 A 1/1996 Agrawal et al.
5,489,857 A 2/1996 Agrawal et al.
5,491,353 A 2/1996 Kean
5,493,239 A 2/1996 Zlotnick
5,497,498 A 3/1996 Taylor
5,506,998 A 4/1996 Kato et al.
5,510,730 A 4/1996 El Gamal et al.
5,511,173 A 4/1996 Yamaura et al.
5,513,366 A 4/1996 Agarwal et al.
5,521,837 A 5/1996 Frankle et al.
5,522,083 A 5/1996 Gove et al.
5,532,693 A 7/1996 Winters et al.
5,532,957 A 7/1996 Malhi
5,535,406 A 7/1996 Kolchinsky
5,537,057 A 7/1996 Leong et al.
5,537,601 A 7/1996 Kimura et al.
5,541,530 A 7/1996 Cliff et al.
5,544,336 A 8/1996 Kato et al.
5,548,773 A 8/1996 Kemeny et al.
5,555,434 A 9/1996 Carlstedt
5,559,450 A 9/1996 Ngai et al.
5,561,738 A 10/1996 Kinerk et al.
5,570,040 A 10/1996 Lytle et al.
5,583,450 A 12/1996 Trimberger et al.
5,586,044 A 12/1996 Agrawal et al.
5,587,921 A 12/1996 Agrawal et al.
5,588,152 A 12/1996 Dapp et al.
5,590,345 A 12/1996 Barker et al.
5,596,742 A 1/1997 Agarwal et al.
5,617,547 A 4/1997 Feeney et al.
5,634,131 A 5/1997 Matter et al.
5,652,894 A 7/1997 Hu et al.
5,655,124 A 8/1997 Lin
5,659,797 A 8/1997 Zandveld et al.
5,698,338 A 12/1997 Barker et al.
5,713,037 A 1/1998 Wilkinson et al.
5,717,943 A 2/1998 Barker et al.
5,734,921 A 3/1998 Dapp et al.
5,742,180 A 4/1998 Detton
5,748,872 A 5/1998 Norman
5,754,871 A 5/1998 Wilkinson et al.
5,761,484 A 6/1998 Agarwal et al.
5,778,439 A 7/1998 Trimberger et al.
5,784,636 A * 7/1998 Rupp .......................... 712/37
5,794,062 A * 8/1998 Baxter ......................... 712/20
5,801,715 A 9/1998 Norman
5,828,858 A 10/1998 Athanas et al.
5,838,165 A 11/1998 Chatter
5,844,888 A 12/1998 Narjjyka
5,867,691 A 2/1999 Shiraishi
5,892,961 A 4/1999 Trimberger
5,915,123 A 6/1999 Mirsky et al.
5,927,423 A 7/1999 Wada et al.
5,936,424 A 8/1999 Young et al.
5,956,518 A 9/1999 DeHon et al.
6,011,407 A * 1/2000 New ........................... 326/39
6,014,509 A 1/2000 Furtek et al.
6,052,773 A 4/2000 DeHon et al.
6,054,873 A 4/2000 Laramie
6,108,760 A 8/2000 Mirsky et al.
6,122,719 A 9/2000 Mirsky et al.
6,127,908 A 10/2000 Bozler et al.
6,289,440 B1 * 9/2001 Casselman .................. 712/227

FOREIGN PATENT DOCUMENTS

DE 19704728 8/1998
DE 19651075 10/1998
EP 0221360 5/1987
EP 0428327 A1 5/1991
EP 748051 A2 12/1991
EP 0539596 A1 5/1993
EP 0678985 10/1995
EP 0707269 A 4/1996
EP 0726532 8/1996
EP 735685 10/1996
EP 0748051 A2 12/1996
EP 0735685 10/1998
EP 726532 8/2000
WO A9004835 5/1990
WO 90/11648 10/1990
WO A9311503 6/1993
WO 94/08399 4/1994
WO 95/00161 1/1995
WO 95/26001 9/1995

OTHER PUBLICATIONS

M. Saleeba, "A Self–Contained Dynamically Reconfigurable Proessor Architecture", Proceedings of the Sixteenth Australian Computer Science Conference, ACSC–16, Queensland, Australia, pp. 59–70, Feb. 3–5, 1993.

C. Maxfield, "Logic that Mutates While–U–Wait" EDN, vol. 41, No. 23, Cahners Publishing, USA, pp. 137–142, Nov. 7, 1996.

J. Villasenor, et al., "Configurable Computing", Scientific American, vol. 276, No. 6, Jun. 1997, pp. 66–71.

Myers, G., "Advances in Computer Architecture", Wiley–Interscience Publication, 2nd Ed., 1978, John Wiley & Sons, Inc., pp. 463–494.

Norman, Richard S., Hyperchip Business Summary, The Opportunity, Jan. 31, 2000, pp. 1–3.

Athanas, Peter, et al., Quantitative analysis of floating point arithmetic on FPGA based custom computing machines IEE Computer Society Press, Apr. 19–21, 1995 pp. i–vii, 1–222.

M. Morris Mano, "Digital Design," by Prentice Hall, Inc., Englewood Cliffs, New Jersey 07632, 1984, pp. 119–125, 154–161.

Villasenor, John, et al., "Configurable Computing Solutions for Automatic Target Recognition," IEEE, 1996 pp. 70–79.

* cited by examiner

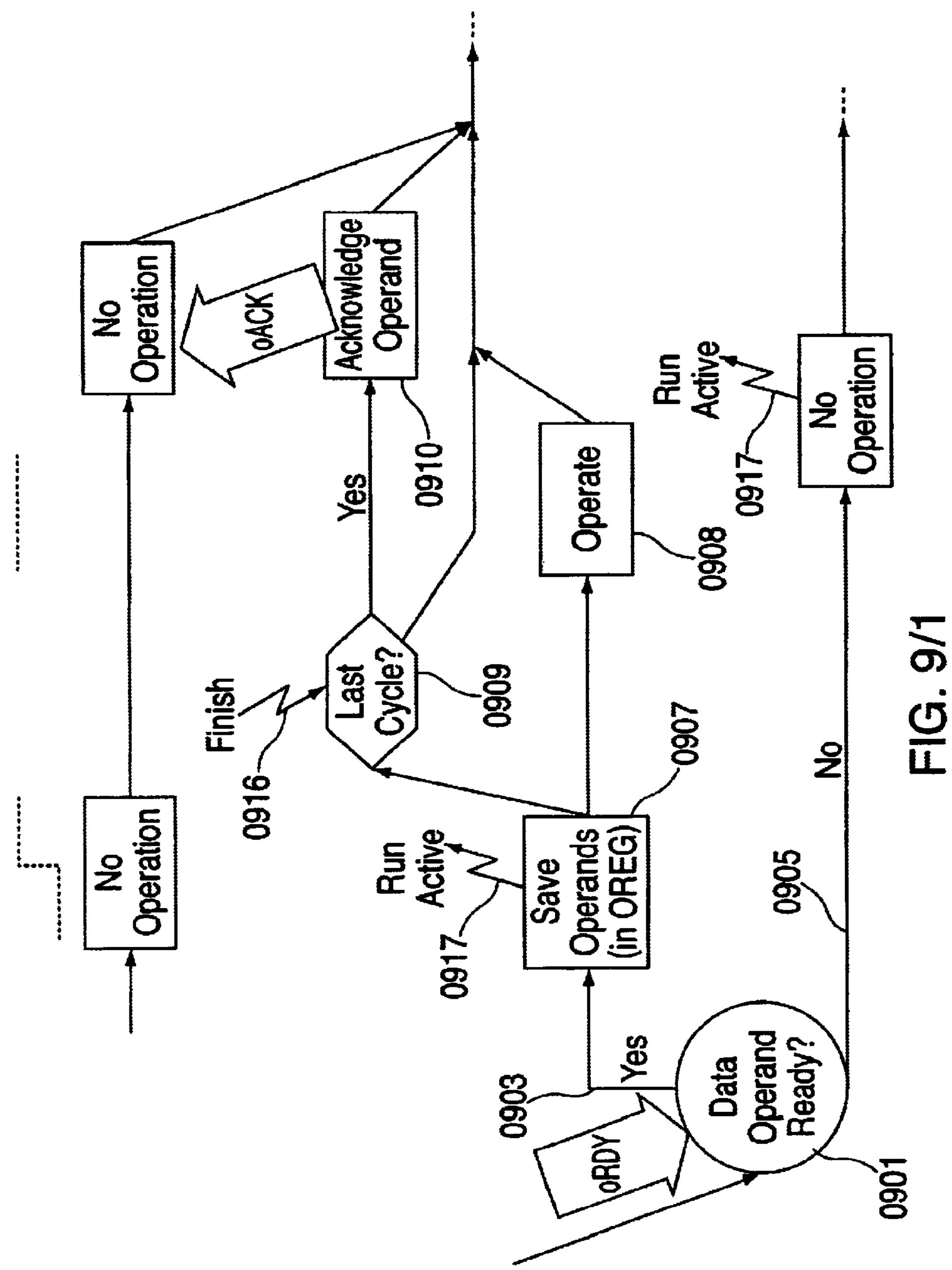
FIG. 9/1

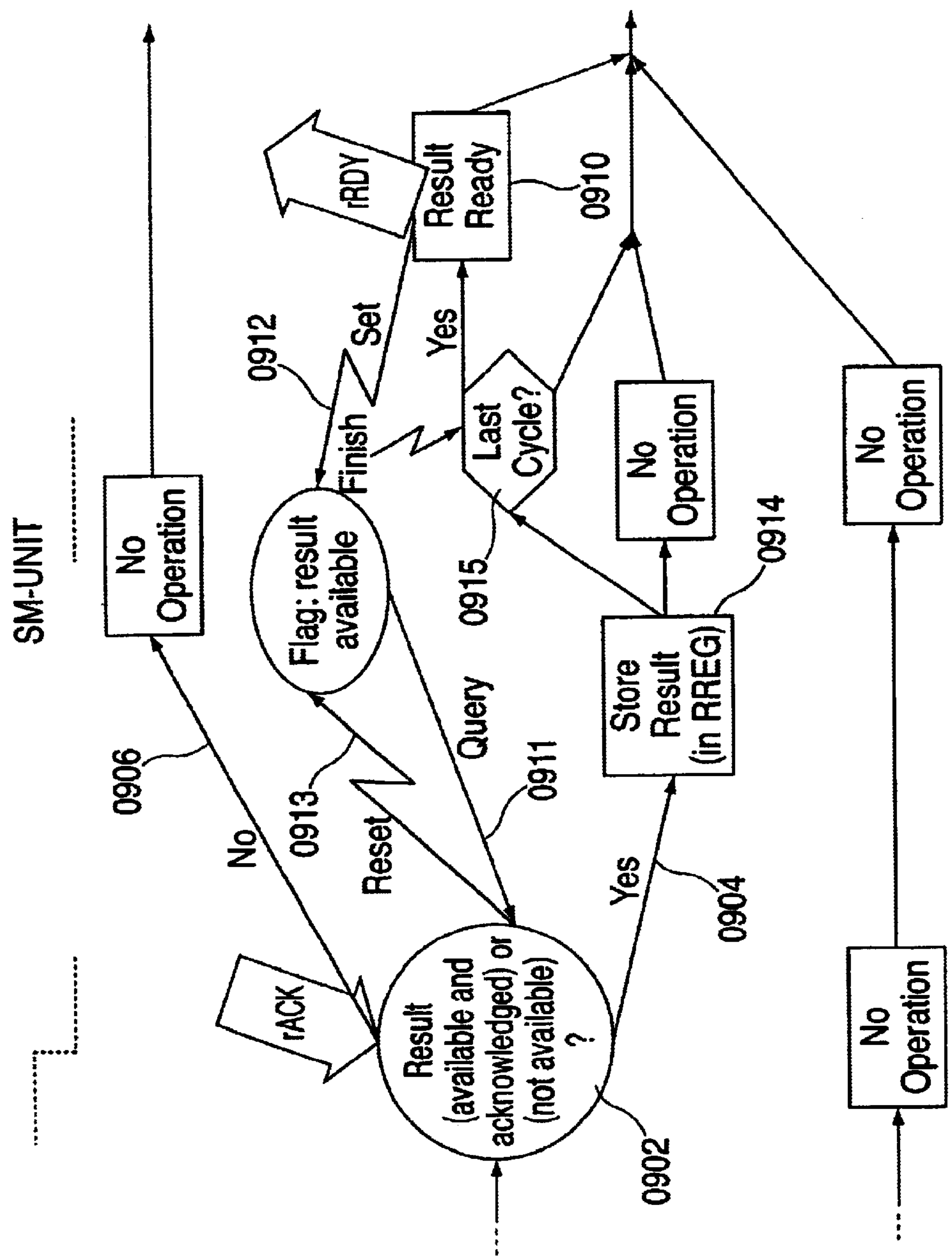
FIG. 9/2

RUNTIME CONFIGURABLE ARITHMETIC AND LOGIC CELL

This application is a continuation of International Patent Application PCT/DE97/02949 filed on Dec. 9, 1997, and a continuation-in-part of U.S. patent application Ser. No. 08/946,810, now U.S. Pat. No. 6,425,068, filed on Oct. 8, 1997.

BACKGROUND INFORMATION

German Patent No. 44 16 881 describes a method of processing data, where homogeneously arranged cells which can be configured freely in function and interconnection are used.

Independently of the above-mentioned patent, field programmable gate array (FPGA) units are being used to an increasing extent to assemble arithmetic and logic units and data processing systems from a plurality of logic cells.

Another known method is to assemble data processing systems from fixed program-controlled arithmetic and logic units with largely fixed interconnection, referred to as systolic processors.

Problems

Units Described In German Patent No. 44 16 881 Units described in German Patent No. 44 16 881 (referred to below as "IVPUS") are very complicated to configure owing to the large number of logic cells. To control one logic cell, several control bits must be specified in a static memory (SRAM). There is one SRAM address for each logic cell. The number of SRAM cells to be configured is very large, thus, a great deal of space and time is needed for configuring and reconfiguring such a unit. The great amount of space required is problematical because the processing power of a VPU increases with an increase in the number of cells, and the area of a unit that can be used is limited by chip manufacturing technologies. The price of a chip increases approximately proportionally to the square of the chip area. It is impossible to broadcast data to multiple receivers simultaneously because of the repeated next-neighbor interconnection architecture. If VPUs are to be reconfigured on site, it is absolutely essential to achieve short reconfiguration times. However, the large volume of configuration data required to reconfigure a chip stands in the way of this. There is no possibility of separating cells from the power supply or having them cycle more slowly to minimize the power loss.

FPGAs

FPGAs for the use in the area described here usually include multiplexers or look-up table (LUT) architectures. SRAM cells are used for implementation. Because of the plurality of small SRAM cells, they are very complicated to configure. Large volumes of data are required, necessitating a comparably large amount of time for configuration and reconfiguration. SRAM cells take up a great deal of space, and the usable area of a unit is limited by the chip manufacturing technologies. Here again, the price increases approximately proportionally to the square of the chip area. SRAM-based technology is slower than directly integrated logic due to the SRAM access time. Although many FPGAs are based on bus architectures, there is no possibility of broadcasting for rapid and effective transmission of data to multiple receivers simultaneously. If FPGAs are to be reconfigured at run time, it is absolutely essential to achieve short configuration times. However, the large volume of configuration data required stands in the way. FPGAs do not offer any support for reasonable reconfiguration at run time. The programmer must ensure that the process takes place properly without interfering effects on data and surrounding logic. There is no intelligent logic to minimize power loss. There are no special function units to permit feedback on the internal operating states to the logic controlling the FPGA.

Systolic Processors

Reconfiguration is completely eliminated with systolic processors, but these processors are not flexible because of their rigid internal architecture. Commands are decoded anew in each cycle. As described above, there are no functions which include broadcasting or efficient minimization of power loss.

SUMMARY

The present invention relates to a cascadable arithmetic and logic unit (ALU) which is configurable in function and interconnection. No decoding of commands is needed during execution of the algorithm. It can be reconfigured at run time without any effect on surrounding ALUs, processing units or data streams. The volume of configuration data is very small, which has positive effects on the space required and the configuration speed. Broadcasting is supported through the internal bus systems in order to distribute large volumes of data rapidly and efficiently. The ALU is equipped with a power-saving mode to shut down power consumption completely. There is also a clock rate divider which makes it possible to operate the ALU at a slower clock rate. Special mechanisms are available for feedback on the internal states to the external controllers.

The present invention is directed to the architecture of a cell as described in, for example, German Patent No. 44 16 881, or, or example, conventional FPGA cells. An expanded arithmetic and logic unit (EALU) with special extra functions is integrated into this cell to perform the data processing. The EALU is configured by a function register which greatly reduces the volume of data required for configuration. The cell can be cascaded freely over a bus system, the EALU being decoupled from the bus system over input and output registers. The output registers are connected to the input of the EALU to permit serial operations. A bus control unit is responsible for the connection to the bus, which it connects according to the bus register. The unit is designed so that distribution of data to multiple receivers (broadcasting) is possible. A synchronization circuit controls the data exchange between multiple cells over the bus system. The EALU, the synchronization circuit, the bus control unit and registers are designed so that a cell can be reconfigured on site independently of the cells surrounding it. A power-saving mode which shuts down the cell can be configured through the function register; clock rate dividers which reduce the working frequency can also be set.

BRIEF DESCRIPTION OF THE DRAWINGS

FIGS. 9/1–9/2 shows the functioning of an example sync UNIT.

DETAILED DESCRIPTION

Figure 1:
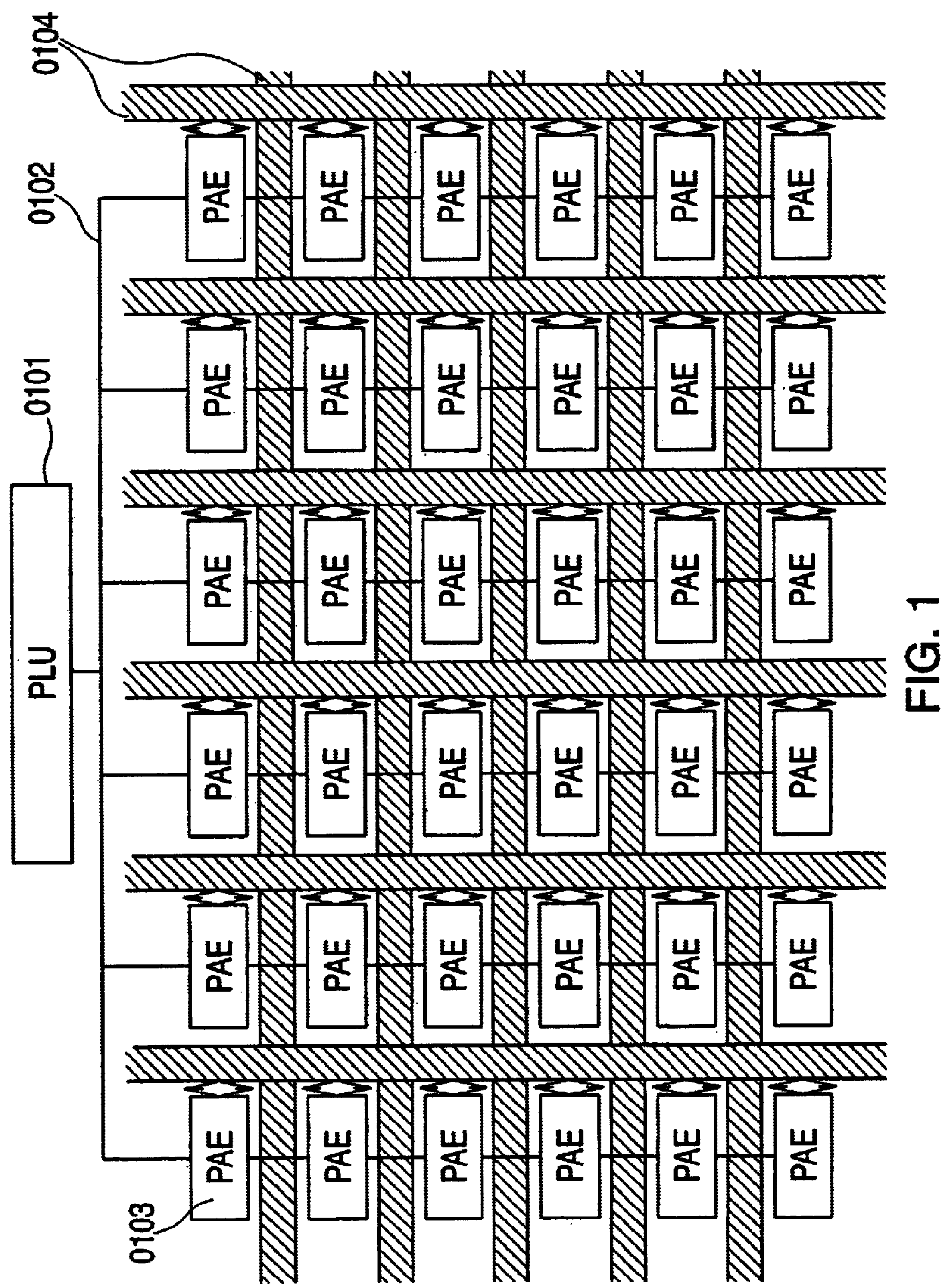
FIG. 1 shows an example arrangement of several PAEs forming one PA with PLU. Without connection to input/output systems or memories.

The present invention relates to the design of a cell (e.g., processing array element or "PAE") as described in German Patent No. 44 16 881, or, for example, conventional FPGA cells, where the PAEs can be cascaded to form an array (e.g., a processing array or "PA"). One PAE is composed of a plurality of function units.

EALU

The computing unit includes an expanded arithmetic and logic unit (EALU) permanently implemented in the logic unit. An EALU is an ordinary known arithmetic and logic unit (ALU) which has been expanded by special functions such as counters. This EALU is capable of performing a plurality of arithmetic and logic operations, which do not have to be specified here exactly, because it is possible to refer to known ALUs. The EALU has direct access to its own results (described below) which are returned as the operand. Thus counters or serial operations such as serial multiplication, division or series expansion are possible. In addition to its result, the EALU delivers the signals Carryout-AlessB and AequalB-Odetect. CarryOut-AlessB specifies either the carry-over in arithmetic operations, or in comparisons by means of subtraction of two values, it specifies the carry-over, i.e., CarryOut-AlessB, that A<B or B<A, depending on the operand negated. The signal is the usual carry-over generated by a full adder. AequalB-Odetect specifies that the result in the result register R-REGsft is zero. The signal is generated by a NOR element from the result. The signals are used for simple status analysis and can be returned to the PLU. Additional status signals can be implemented, depending on the application.

The function of the EALU is configured in a function register (F-PLUREG).

O-REG

The input operands of the EALU are stored in two independent operand registers (O-REG). The input operands are thus available independently of the status of the unit supplying the data (data transmitter). This permits decoupling from the bus and for the PAs to be freely reconfigurable. One or both O-REGs have a shift function which is triggered by the EALU, for each O-REG individually, if so required. The shift function makes it possible to perform serial operations such as serial multiplication or division in the EALU. O-REGsft denotes O-REGs with a shift function.

R-REGsft

The result of the EALU is stored in a result register (R-REGsft). This provides time independence of the unit or units receiving the result (data receivers). The R-REGsft has a shift function which is triggered by the EALU, thus permitting serial operations.

R2O MUX

The result data available in R-REGsft is introduced as an operand through a multiplexer (R2O-MUX) between one of the O-REGs and the EALU to guarantee feedback of results for serial operations, counters and similar functions. The multiplexer is set by the F-PLUREG.

Clock Cycles

It is appropriate but not absolutely necessary to trigger the O-REG sft at a clock pulse edge and the R-REGsft at the subsequent negated clock pulse edge. Thus, the EALU has a half clock pulse available to carry out its function; the second half clock pulse is available for signal propagation times and multiplexers. Thus, it is possible to perform a complete operation in each clock pulse.

StateMachine, SM Unit

An SM UNIT is available for sequence control in the EALU. The SM UNIT controls the O-REG and R-REGsft and their shift function, as well as controlling the R2O-MUX. Consequently, serial operations and shift and counting functions can be performed easily by the EALU. The state machine is easy to implement by the conventional methods.

Sync UNIT

A synchronization unit (Sync UNIT) is provided for synchronization of one PAE in an array (PA) of PAEs. The Sync UNIT analyzes a series of input signals, which execute a handshake protocol.

rACK(h/l): The data receiver acknowledges the data received, rACKh being the acknowledgment of the high result byte (bits 8 through 15) and rACKl being the acknowledgment of the low result byte (bits 0 through 7 ). The two are linked with an AND (rACKh AND rACKl) and yield the signal rACK. rACK is not true while one or both data receivers are busy processing their data and becomes true when the processing of the data of both data receivers is concluded, and the result is stored in the R-REGsft of the respective data receiver. The rACK(h/l) signals are often considered below in their AND-linked form as rACK (=rACKh & rACKl).

ORDY(½): The data transmitter signals its readiness to send new data. ORDY is not true while the data transmitter is busy processing its data, and it becomes true when the result of the data transmitter, which is the operand of the PAE, is available. oRDY1 is the enable signal of the data transmitter of the first operand, and oRDY2 is that of the second. The two are linked with an AND (oRDY1 AND oRDY2) and yield the ORDY signal. ORDY is true only when both data transmitters are ready to send data. The oRDY(½) signals are often considered below in their AND-linked form as ORDY (=oRDY1 & oRDY2).

Output signals generated from the input signals and the status of the sync UNIT which, together with the sequence control of the EALU, represent the overall status of the PAE; those output signals are in turn regarded as input signals by the sync UNITs of the data transmitters and receivers. Status information and the F-PLUREG register are used for sequence control of the EALU.

rRDY: Indicates that the PAE has finished its data processing and a result is available in R-REGsft. rRDY is transmitted as rRDYh and rRDYl to both data receivers. However, it is the same signal in each case.

oACK: Indicates that the PAE has processed its operands and can receive new data in O-REG(sft). oACK is transmitted as oACK1 and oACK2 to both data transmitters. However, it is the same signal in each case.

The RDY signals retain their level up to the input of the acknowledgment through ACK. This is necessary when the data receiver is reconfigured while the data are being made available. If RDY is applied until acknowledged through ACK, the data receiver will recognize after the reconfiguration that data is available and will accept it.

The linking of the signals over multiple PAEs is as follows:

| Data transmitter | | PAE | | Data receiver |
|---|---|---|---|---|
| rRDY | → | oRDY rRDY | → | oRDY |
| rACK | ← | oACK rACK | ← | oACK |

This means that the output signal rRDY of the data transmitter, for example, represents the input signal oRDY1 or oRDY2 of PAE. The output signal rRDY of PAE is the input signal ORDY of the data receiver.

The sync UNIT has the following types of sequences:

| Mode | Description | Comments |
|---|---|---|
| Wait OP | The PAE waits for operands | Only if no multiple-cycle operation is taking place |
| Cycle 1 | A single-cycle operation is being carried out | Operands are acknowledged |
| Cycle n | One cycle of a multiple-cycle operation is being carried out | — |
| Cycle Z | The last cycle of a multiple-cycle operation is being carried out | Operands are acknowledged |
| Wait ERG | The PAE waits for acknowledgment of the result | Only if a preceding result exists |
| Stop | Stops execution after conclusion of the current cycle, then acknowledges ReConfig if the result has also been acknowledged | — |

The sync UNIT makes available a special mode which enables the clock signal only when operands are available. This mode is appropriate especially when the data transmitters do not supply the data in each clock pulse of the processor but instead only in every $n^{th}$ clock pulse. Then the clock cycle corresponds to one period of the normal clock cycle and is enabled through rACK or oRDY(½). The enable is referred to as OneShot. This mode is called the OneShot MODE. The clock pulse is AND-linked with one of the enable signals through an AND gate. The mode and signal selection take place through F-PLUREG. The enable signal generated through rACK or oRDY(½) can be lengthened by the SM UNIT. This is necessary so that operations which need more than one cycle can be carried out in one-shot MODE. To make this possible, a corresponding signal line of the SM UNIT is OR-linked to the enable signal.

If the registry entry STOP is set in F-PLUREG, the sync UNIT runs the current function to the end. Thereafter, no more operands are accepted or acknowledged. As soon as rACK indicates that the result has been accepted by the data receiver, the readiness of the PLU for reconfiguration is indicated by the ReConfig signal. The signal is generated when rACK stores the stop of F-PLUREG in a D flip-flop. ReConfig can be polled by read access of the PLU to F-PLUREG at the stop bit position.

Likewise, the sync UNIT can be used to generate and analyze error states or other status signals.

BM UNIT

To apply the operands and the result to the external bus systems, there is a bus multiplex unit (BM UNIT). The BM UNIT has two multiplexers and two gates, with the two multiplexers being for the operands (O-MUX) and the two gates for the result (R-GATE), one switch being for the higher-order result and one for the low-order result. The multiplexers and switches are controlled over the multiplexer register (M-PLUREG). The sync UNIT signals are controlled over the switches to the bus. The correlation of the multiplexers/switches and signals is as follows:

O-MUXl:oRDY1, oACK

O-MUX2:oRDY2, OACK

RH-GATE:rRDY, rACKh

RL-GATE:rRDY, rACKl

The R-GATE can be brought by M-PLUREG to a state in which it does not drive a bus system.

The table gives a description of the signals and their interface architecture:

| Signal | oRDY | oACK | rRDY | rACK | D7–0 |
|---|---|---|---|---|---|
| Indicates | operands ready | operands acknowledged | result ready | result acknowledged | data |
| Type | input | open collector | driver | input | bidirectional |

It is possible to operate several data receivers from one data transmitter (broadcasting). To do so, several data receivers are connected to the same bus. To guarantee acknowledgment of the data, the driver stage of the acknowledgment line OACK is designed as an open collector driver. The bus operates as wired AND, i.e., only when all data receivers have acknowledged the data does the H level required for the acknowledgment occur. This is accomplished by the fact that this data receiver which does NOT acknowledge the data pulls the bus to an L level over an open collector transistor. Data receivers which acknowledge the data do not trigger the open collector transistor and thus add no load to the bus. When all the data receivers have acknowledged the data, there is no more load on the bus and it assumes an H level via a pull-up resistor.

State-back UNIT

The PAE is capable of supplying feedback about its operating state to its primary logic unit, hereinafter called PLU (see DE 44 16 881 A1). The primary logic unit configures the PA and requires information about the status of the individual PAEs in order to be able to perform appropriate reconfigurations. This is done through the State-Back UNIT. This transmits either the lower 3-bit of the result from the R-REGsft—to deliver calculated values to the PLU—or the CarryOut-AlessB and AequalB-Odetect signals to a 3-bit status bus, depending on the entry in the F-PLUREG. To allow signals to be impressed from several PAEs, a simple wired-OR method over open collector drivers is used. In order for the reconfiguration of the PAE to begin only when the receiver has acknowledged the data, a latch unit can be inserted between the signals and the open collector drivers to enable the signals only after receipt of rACK. The status bus is monitored by the PLU, which reacts by its program flow and reconfiguration to the status supplied by the bus.

Power UNIT

The PAE has a power-saving mode (Sleep MODE) which, like the function of the EALU, is set in F-PLUREG. There is a bit for this which, when set, starts the sleep MODE. To do so, either the clock line of the PAE is set at a constant logic 0 or 1, or the voltage of the PAE is turned off via a transistor. F-PLUREG is always energized within the PAE and cannot be switched off. Unused areas (gates) of the PAE for the function executed are switched off by analysis of the F-PLUREG. This is done through a transistor which isolates those areas from the power supply. To prevent unwanted interference, the outputs of the areas are defined over pull-up/pull-down resistors.

In addition, the power save MODE can also be used within the one-shot MODE which is controlled by the sync UNIT. All parts of the PAE except the F-PLUREG, M-PLUREG and sync UNIT are isolated from the power supply. Only when the sync UNIT senses a one-shot mode are all the required PAE parts connected over the power UNIT. The sync UNIT delays the clock signal until all the newly connected parts are capable of functioning.

Registers

The F-PLUREG and M-PLUREG registers are connected to the PLU bus. The addresses of the data packages sent by the PLU are decoded in a comparator. If the address of the PAE is recognized, the data is stored in the registers. The PLU bus has the following architecture:

AX7-0: X address of the X/Y matrix

AY7-0: Y address of the X/Y matrix

RS: Register select; logic 0 selects F-PLUREG, logic 1 selects M-PLUREG

AEN: Address enable; the bus contains a final address. The addresses must be decoded as long as AEN is logic 0. AEN is logic 0 during the entire bus access, i.e., also during the data transmission.

D23-00: Data

DEN: Data enable; the bus contains final data. The data must be transferred to the register at the rising edge of the DEN signal.

OEN: Output enable; the PLU reads valid data out of the PLUREGs.

Architecture of F-PLUREG:

1. The architecture of the register in write access:

| F11 | F10–9 | F8 | F8 | F5 | F4–0 |
|---|---|---|---|---|---|
| Stop | StateBack | Sleep | OneShot | PowerSave | EALU function |

The functions of the individual bits:

| Function | State | Effect |
|---|---|---|
| Stop | 0 | Normal function |
| | 1 | Stop functions after current cycle, no acknowledgment of the operands |
| StateBack | 00 | No feedback, bus open |
| | 01 | D2–0 to bus |
| | 10 | Carryout-AlessB, AequalB-0detect to bus |
| | 11 | Illegal |
| Sleep | 0 | No function, de-energized |
| | 1 | Normal function, energized |
| OneShot | 00 | Normal function |
| | 01 | OneShot to oRDY1 |
| | 10 | OneShot to oRDY2 |
| | 11 | OneShot to (rACKh & rACKl) |
| PowerSave | 0 | No PowerSave |
| | 1 | Power-saving mode in combination with one-shot mode |
| EALU function | 00000 | No operation (NCP) |
| | 00001 | |
| | ... | Function according to design of the EALU |
| | 11111 | |

The reset state is 0 in all bits.

2. Register architecture in read access:

| F11 |
|---|
| ReConfig |

The functions of the individual bits:

| Function | State | Effect |
|---|---|---|
| ReConfig | 0 | No reconfiguration possible |
| | 1 | Reconfiguration possible |

The reset state is 0 in all bits.

Architecture of M-PLUREG:

| M23–18 | M17–12 | M11–06 | M05–00 |
|---|---|---|---|
| High-order result | Low-order result | Operand 1 | Operand 0 |

The values M(n+5)–.n=000000, n $\epsilon\{0,6,12,18\}$ mean that the multiplexers/switches are open and have no bus contact. It may be appropriate to block M-PLUREG via the ReConfig signal, i.e., as soon as ReConfig is activated, PAE disconnects from all bus systems. The reset status is 0 in all bits.

SUMMARY

The function of PAE can be configured and reconfigured more easily and quickly than in known technologies, in particular the FPGA technology. The interconnection of the ALU is specified in M-PLUREG, whereas in the traditional technologies a plurality of individual unrelated configuration bits must be occupied. The transparent architecture of the registers simplifies (re)configuration.

Due to the direct design as an ALU, the PAE requires less space than in traditional technologies where ALUs have been implemented by a plurality of logic cells. At the same time, the run delays are lower and the attainable clock frequencies are higher accordingly.

A broadcasting function is guaranteed due to the design of the BM UNIT, and acknowledgment is automatic. A data transfer that is largely independent in time is guaranteed due to the input and output registers (O-REG, R-REG).

Configuration and reconfiguration are greatly simplified due to the decoupling of each PAE from the overall system through the O-REG and R-REG registers since the individual PAEs are largely independent of one another. Feedback to the PLU as well as the interaction of STOP and ReConfig permit efficient control of (re)configuration.

Power-saving functions have been implemented which lead to a reduction in power consumption—automatically to some extent (one-shot MODE).

The PAE architecture can be implemented in the FPGAs to increase their efficiency. Arithmetic operations can thus be implemented much more efficiently.

DESCRIPTION OF THE FIGURES

Referring now to the figures, FIG. 1 shows a simplified processor according to German Patent 44 16 881 A1. The PLU (0101) and its bus system (0102) are shown. The PAEs (0103) are shown as an array, and the internal bus system (0104) in the chip is indicated schematically.

Figure 2:
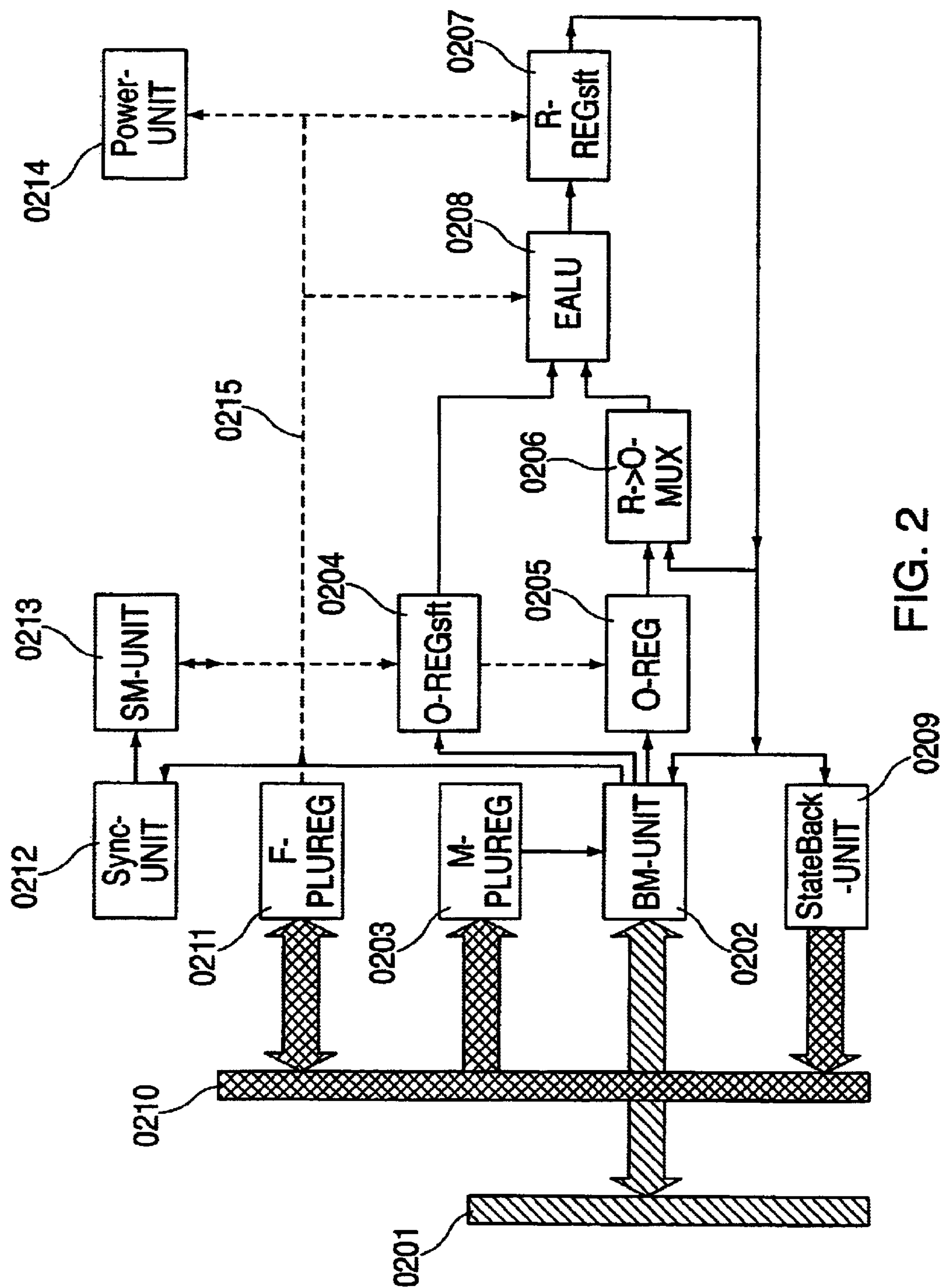
FIG. 2 shows an example architecture of a PAE.

FIG. 2 shows the schematic architecture of a PAE. The internal bus system (0201) within the chip is connected to the BM UNIT (0202) which connects the buses selected by M-REG (0203) to O-REGlsft (0204) as operand 1 and O-REG (0205) as operand 2. The result available in result register R-REGsft (0207) is optionally introduced into the data path of operand 2 over R2O-MUX (0206). The data from O-REGsft (0204) and R2O-MUX (0206) are processed in the EALU (0208). Feedback goes to the PLU over the state-back UNIT (0209). The PLU bus (0210) is connected to the F-PLUREG (0211) and M-PLUREG (0212) registers and to the state-back UNIT (0209), and the PAE is configured and monitored over it. F-PLUREG contains all functional configuration data, M-PLUREG contains the interconnection information of the PAE. The sync UNIT (0212) controls the interaction of the data exchange between the data transmitters, the data receivers and the processing PAE. The SM UNIT (0213) controls the entire internal sequence of the PAE. The power UNIT (0214) regulates the power supply and serves to reduce power consumption.

Figure 3:
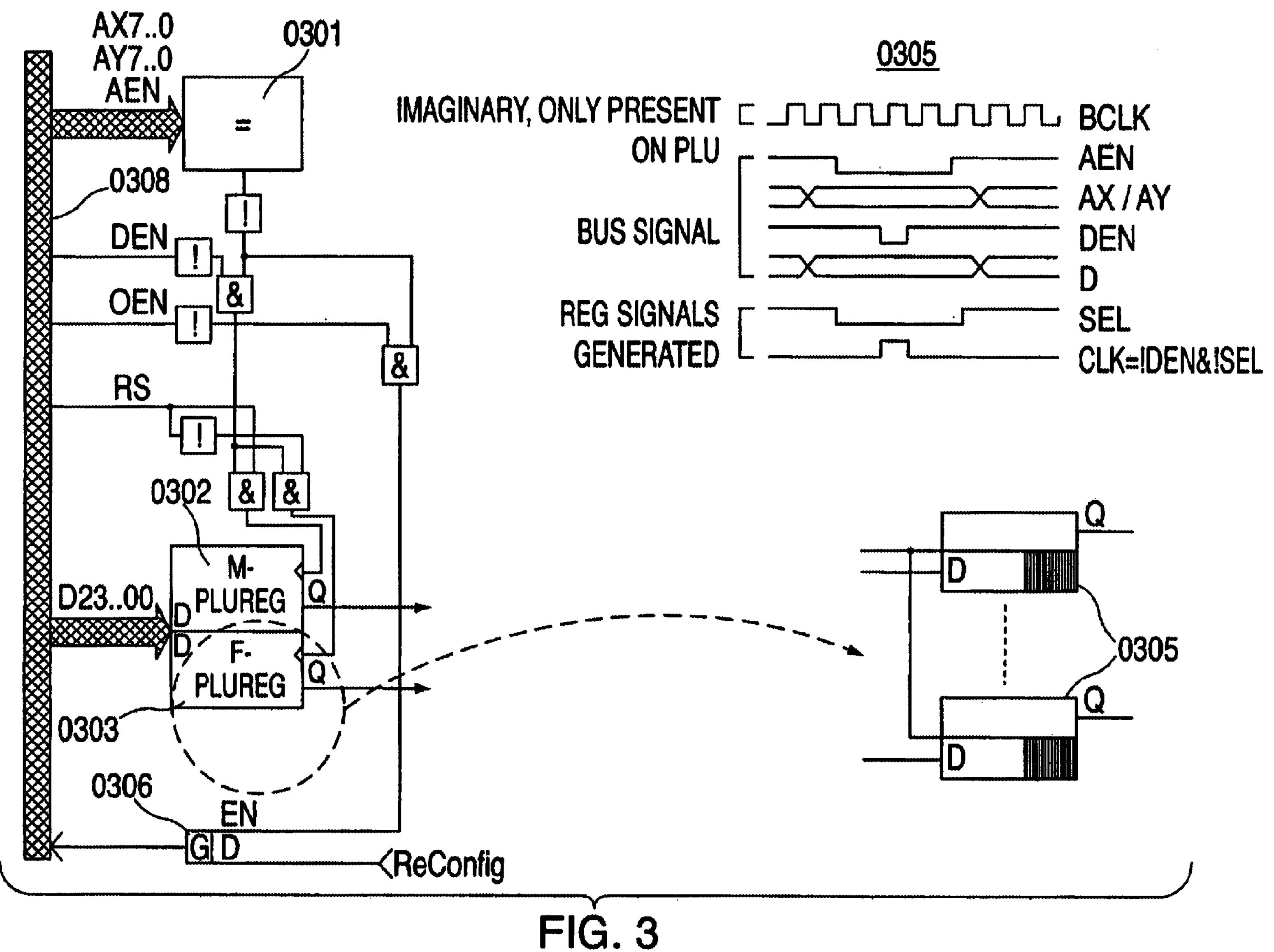
FIG. 3 shows an example architecture of F-PLUREG and M-PLUREG.

FIG. 3 illustrates the functioning of the M-PLUREG and F-PLUREG registers. The AX and AY addresses of the PLU bus (0308) are compared with the address of PAE in a comparator (0301) if AEN (address enable) indicates a valid bus transfer. Each PAE has a unique address composed of its line and column within a PA. If DEN (data enable) indicates data transmission, then either M-PLUREG (0302) or F-PLUREG (0303) is selected over RS (register select). The data are stored in the respective register at the rising edge of DEN. The registers are implemented as D flip-flops (0304). Timing diagram 0305 illustrates the sequence. The ReConfig signal is sent from the sync UNIT to the PLU bus only over the gate (0306) for read access to the F-PLUREG. Enable is based on the result of the comparator (0301) AND the OEN signal.

Figure 4A:
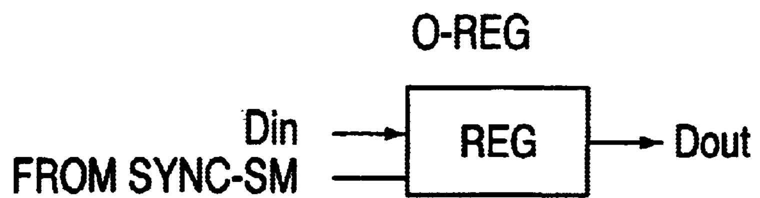
FIGS. 4*a*–4*c* shows an example architecture of an O-REG.
Figure 4B:
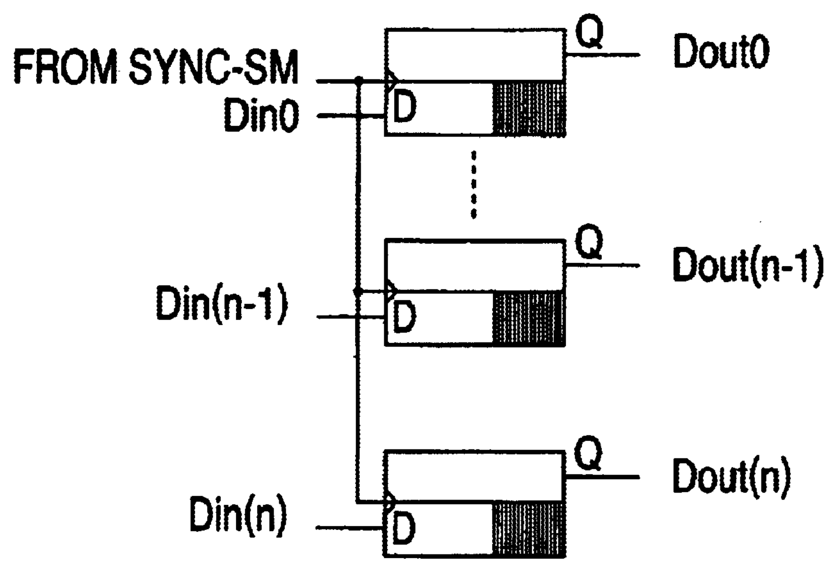
Figure 4C:
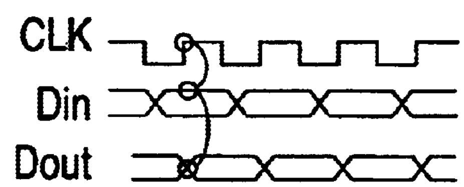

FIG. 4*a* shows a block diagram of O-REG. FIG. 4*b* shows how the O-REG is constructed of D flip-flops. FIG. 4*c* shows the timing diagram. The clock signal is generated by SYNC-SM.

Figure 5A:
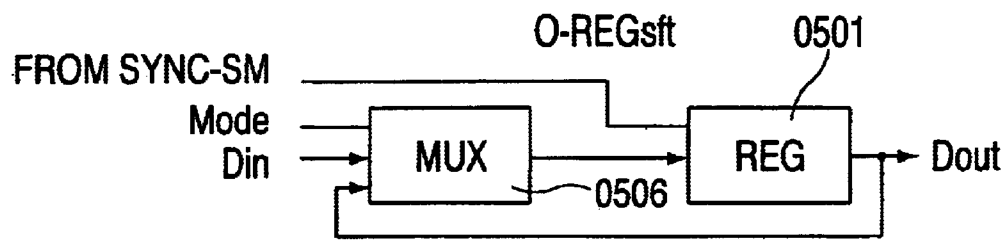
FIGS. 5*a*–5*c* shows an example architecture of an O-REGsft with a right shift function.
Figure 5B:
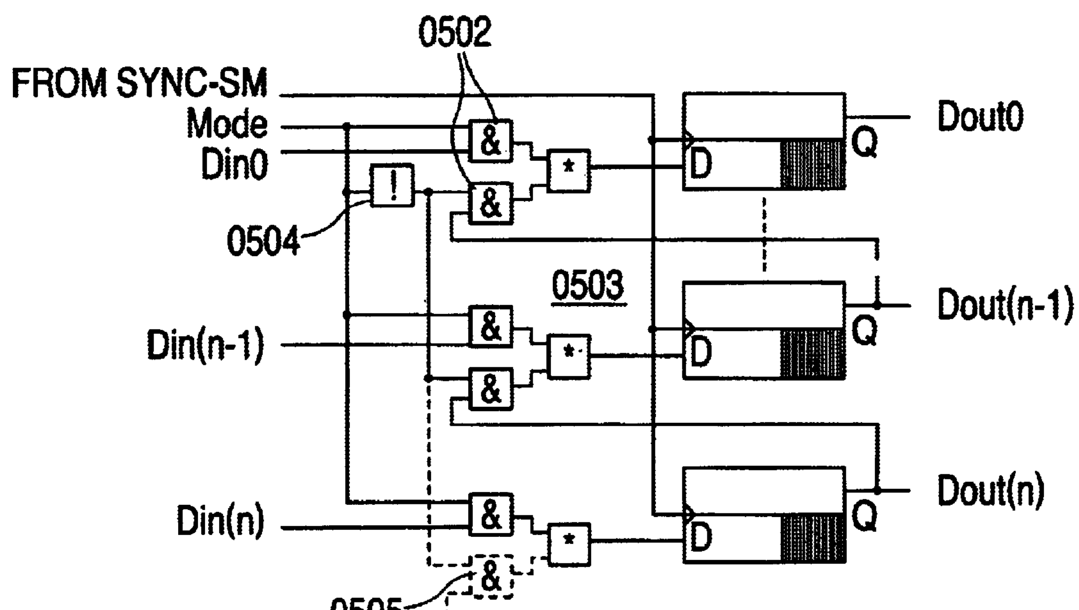
Figure 5C:
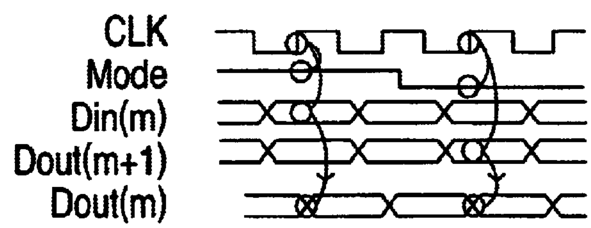

FIG. 5*a* shows a block diagram of O-REGsft. FIG. 5*b* shows how O-REGsft is constructed of D flip-flops (0501). The AND gates (0502) and OR gates (0503) form, via the inverter (0504), a mode-controlled multiplexer (0506) which either switches the input data to the D flip-flops (0501) or sends the output data of the D flip-flops, shifted by one bit, to their inputs. The AND gate (0505) is not necessary, because one input is permanently at logic 0. It is shown only for the purpose of illustration. FIG. 5*c* shows the timing diagram as a function of the signal mode. The clock pulse is generated by SYNC-SM.

Figure 6A:
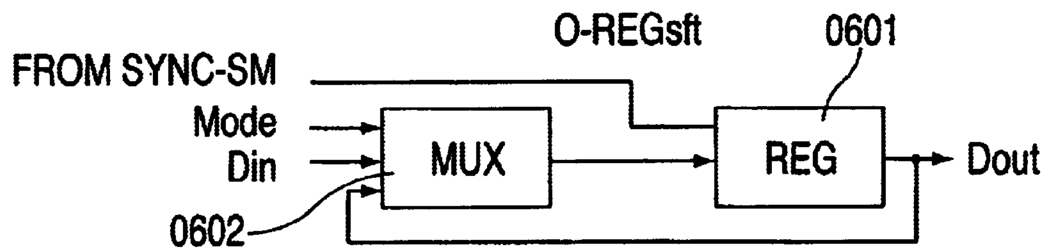
FIGS. 6*a*–6*c* shows an example architecture of an R-REGsft with right/left 1–2 bit barrel shifter.
Figure 6C:
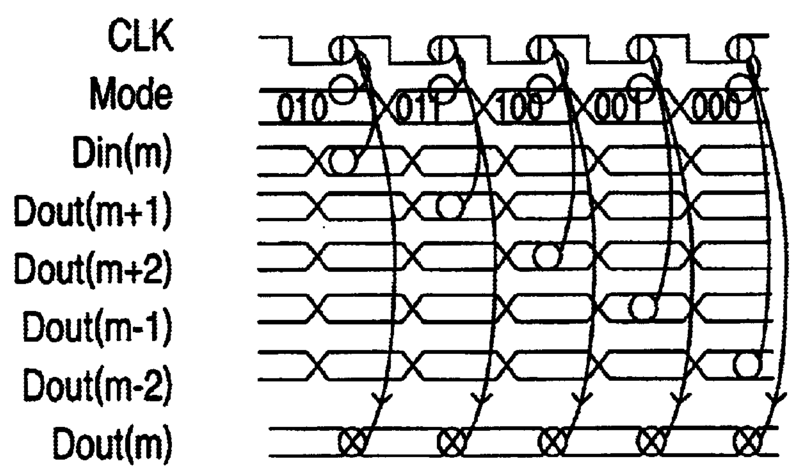
Figure 6B:
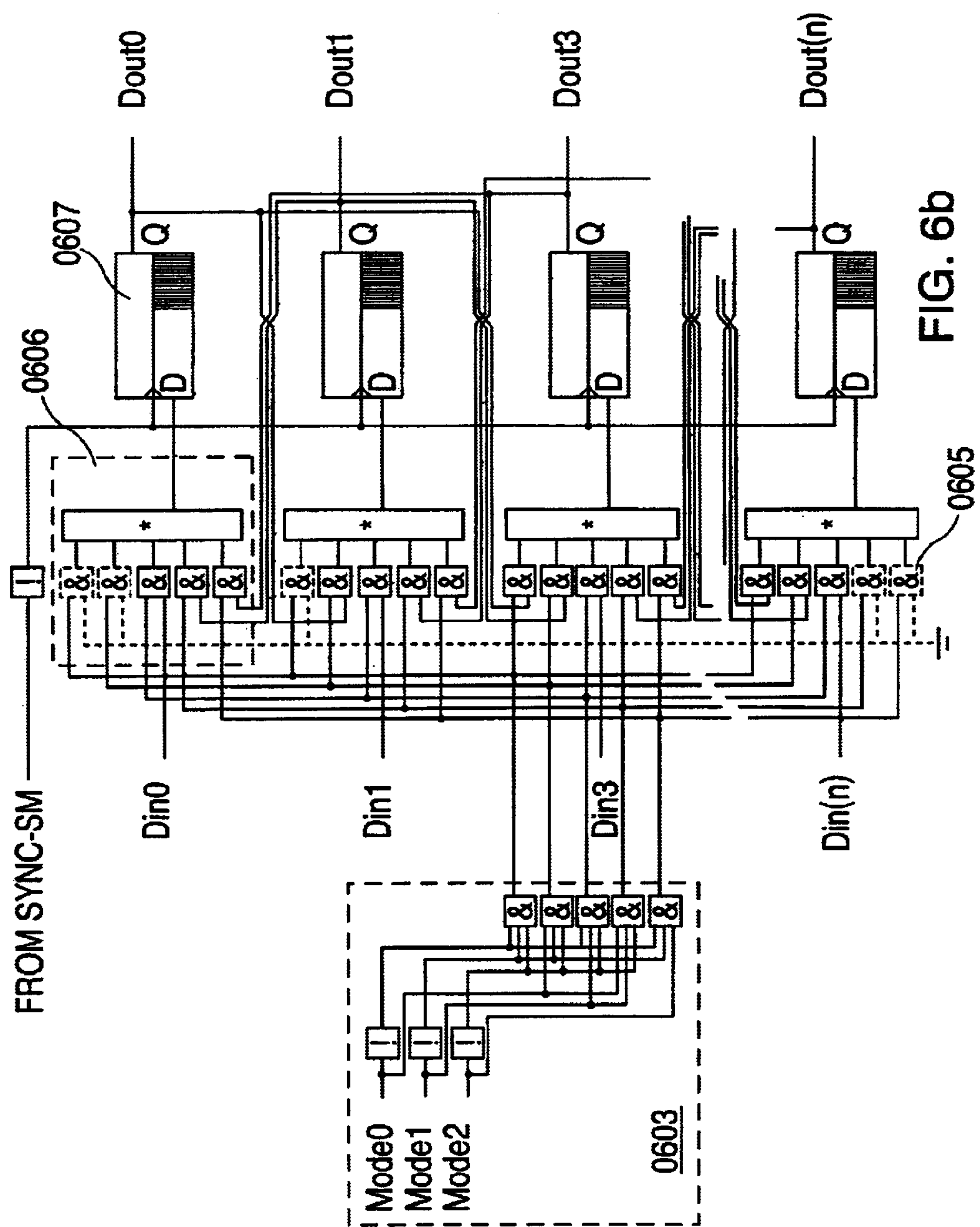

FIG. 6*a* shows the block architecture of R-REGsft. Upstream from the register (0601) there is a multiplexer (0602) which either switches the input data to the register (0601) or directs the shifted output data of the register (0601) to its input. The clock pulse generated by SYNC-SM is sent to the register, shifted by one half clock pulse. FIG. 6*b* shows the block diagram on a gate level. Modes 0–2 switch a multiplexer (0606) consisting of AND gates with a downstream OR gate via a decoder (0603). Gates shown with dotted lines (0605, etc.) are shown only for the sake of illustration. They are functionless, because one input is constantly at L. The multiplexer switches the input signal to the registers (0607) in modes 0–2=010. In modes 0–2=000 to modes 0–2=001, the output values of the registers (0607) are shifted by one bit to the left, and in modes 0–2=011 to modes 0–2=100 they are shifted by two bits to the right and sent to the inputs of the registers. The timing diagram in FIG. 6*c* illustrates the shift function, depending on modes 0–2.

Figure 7A:
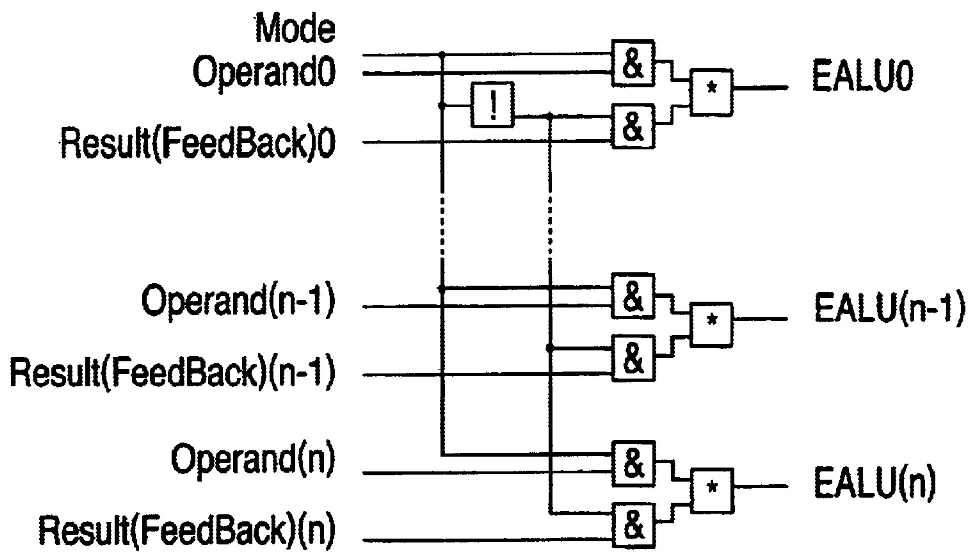
FIGS. 7*a*–7*b* shows an example architecture of the R2O-MUX and implementation of a MUX in transfer gate technology.
Figure 7B:
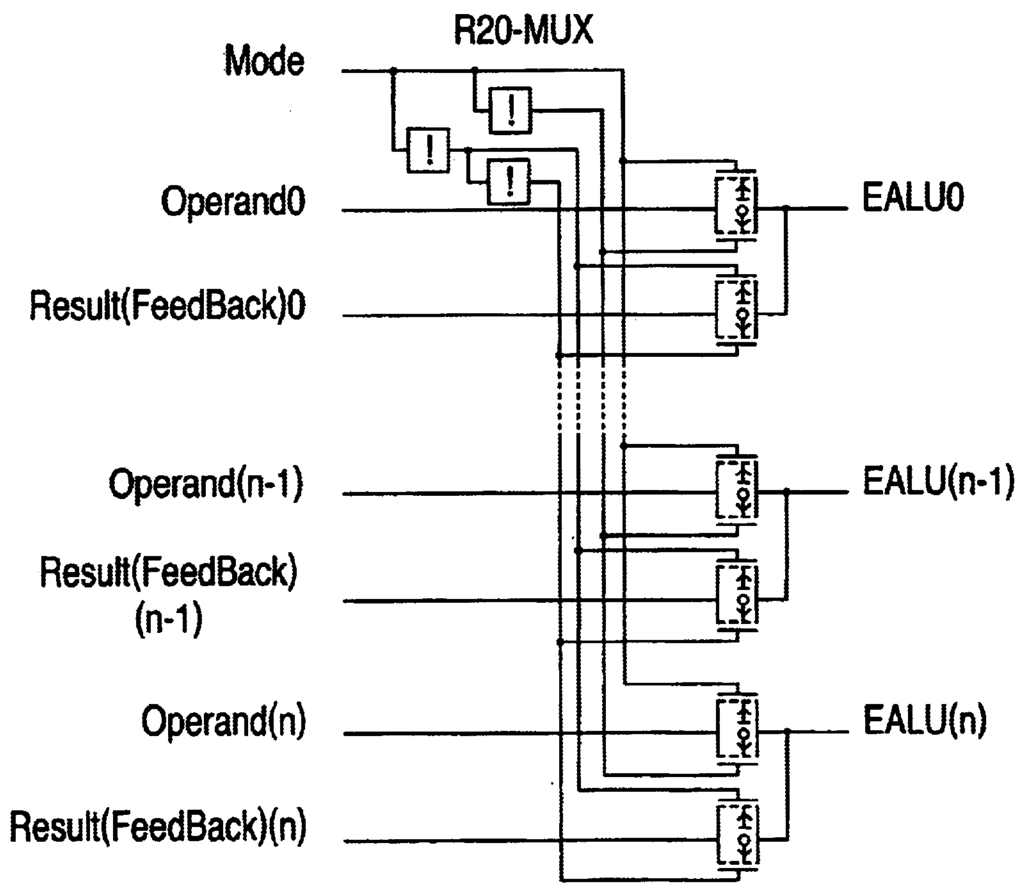

FIG. 7*a* shows the architecture of multiplexer R2O-MUX which sends the operands or the result to EALU as a function of mode. FIG. 7*a* shows a traditional multiplexer design, while FIG. 7*b* shows the space-saving and power-saving variant due to the use of CMOS transfer gates (0701). All the multiplexers described in this document can be constructed with transfer gates.

A gate may be composed of transfer gates in a design equivalent to that of the multiplexer. However, the direction of data exchange is exactly the opposite!

Figure 8:
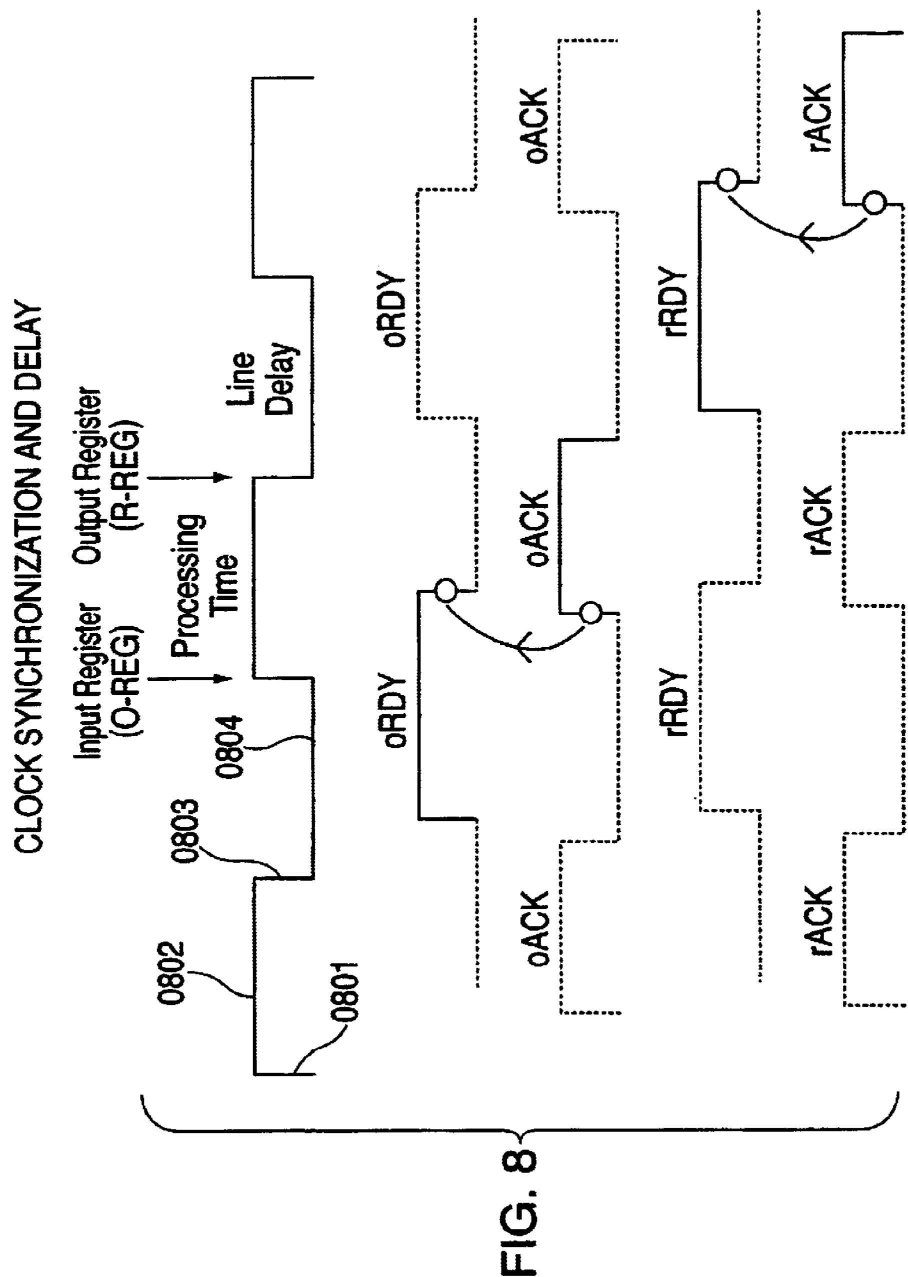
FIG. 8 shows example clock synchronization, delays and sync signals.

FIG. 8 shows the relationship of PAE-internal clock CLK to the activities taking place. At the rising edge (0801), operands are stored in the O-REG. During the H level (0802), PAE processes the data (ΔPAE=processing phase). This includes the data traffic between O-REG and R-REG. At the trailing edge (0803) the result is stored in R-REG. The L level (0804) is used for distribution of the BM UNIT enclosed in the bus system (Δnetwork=bus phase). The time sequence of signals (ORDY and OACK, rRDY and rACK) generated by SYNC-SM is shown in the time diagram.

FIG. 9 shows the sequence diagram of the sync UNIT. The state machine recognizes two fixed states, DATA (0901) and RESULT (0902). DATA is synchronized at the rising edge, RESULT at the trailing edge. The status of the input parameters is analyzed and, depending on the result, the machine jumps to the YES branch (0903/0904) or the NO branch (0905/0906). If the operands are not ready in DATA, the machine jumps to NO. No operation is carried out in the next steps until the machine jumps back according to DATA and performs an analysis again. If operands, indicated by ORDY, are ready, the operands are stored in O-REG (0907). The operands are processed (0908) and analyzed (0909) at the same time to ascertain whether it is the last cycle in multiple-cycle operations (serial operations requiring more than one clock cycle) or whether a single-cycle operation is taking place. In these cases, the operands are acknowledged by oACK (0910). RESULT is synchronized with the trailing edge, and a check is performed to determine whether the "result available" flag has been set (0911). This flag is always set when a finished result is signaled by rRDY (0912).

In two cases, the system jumps to the YES branch (0904):

1. There is no preceding result ("result available" flag is false).
2. There is a preceding result ("result available" flag is true) and it is acknowledged with rACK. In this case (and only in this case(!)) 0902 resets the result (0913).

Otherwise the system jumps to the NO branch (0906) and no operation is carried out until the state machine returns after RESULT (0902). In the YES branch (0904) the result is stored in output register R-REGsft (0914). It is then determined whether this is the last cycle of a multiple-cycle operation (0915) (cf. 0909) or a single-cycle operation; if yes, the presence of the result is signaled by rRDY (0916). The state machine returns after DATA (0901). The recognition of whether it is the last cycle of an operation—or a single-cycle operation—can be queried of the SM UNIT via the FINISH signal (0916). This is active when the last—or single—cycle takes place. The status of the sync UNIT is signaled to the SM UNIT via RUN (0917). RUN is active in the event an operation is taking place; otherwise it is inactive. The mechanism of the STOP entry in F-PLUREG and the ReConfig generated from this are not shown in FIG. 9 because the sequence is trivial and is apparent from the description of the sync UNIT.

Figure 10:
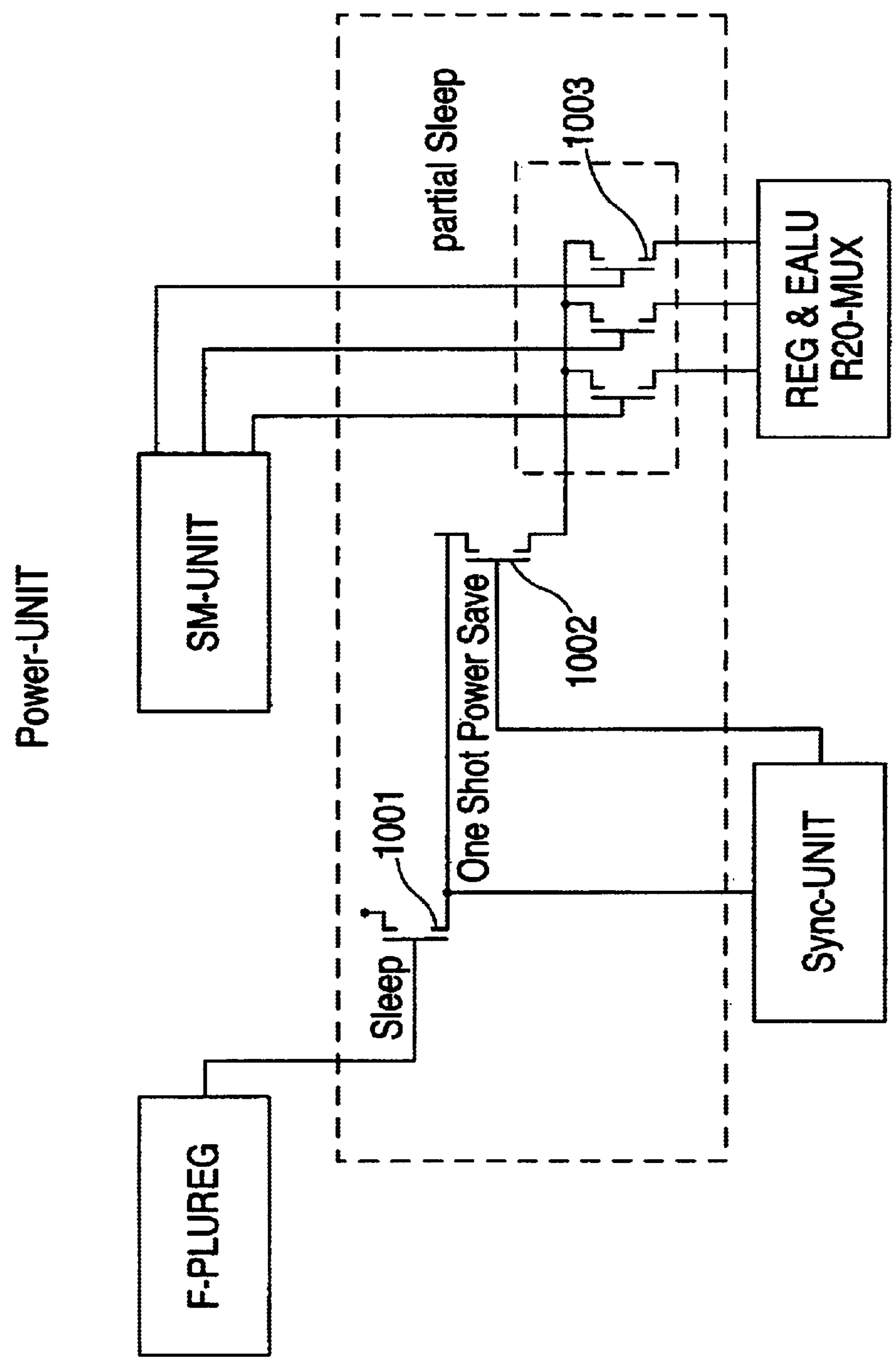
FIG. 10 shows an example architecture of a power UNIT.

FIG. 10 shows the basic architecture of the power UNIT. The sleep signal is sent from F-PLUREG to a transistor or a transistor stage (1001) which controls the power supply for all cell functions that can be switched off. The sync UNIT delivers the one-shot power-save signal (see FIG. 16) which enables the power supply of the remaining cell functions via a transistor or transistor stage (1002). Depending on the functions actually used in the cell, the transistors or transistor stages (1003) shut down the unneeded functions (power down). It is understandable that other similar means such as capacitors, etc., must be provided for proper power supply and EMC behavior.

Figure 11:
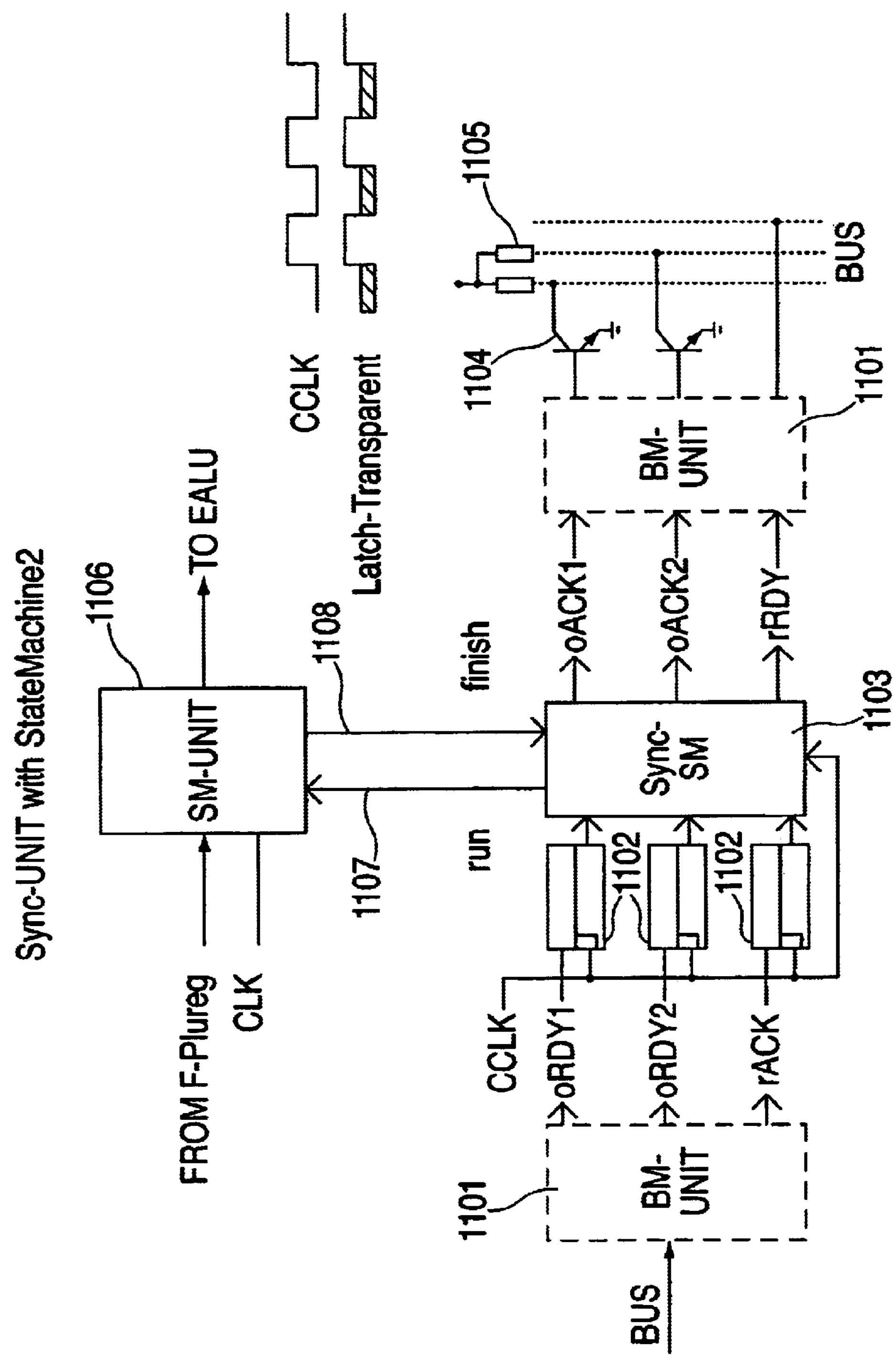
FIG. 11 shows an example architecture of a sync UNIT.

FIG. 11 shows the implementation of the machine from FIG. 9 in the concept. The oRDY(½) and rACK signals are switched over the BM UNIT (1101) (in simplified terms—there is actually rACKh and RACKl, rACK=rACKl & rACKh) to the CCLK-controlled latches (1102). The latches are switched in such a way that they are transparent in the L phase (bus phase) of CCLK and hold their status in the H phase (processing phase). The outputs of the latches make available the signals for the sync state machine (1103). rRDY (in simplified terms: there are actually rRDYh and rRDYl—they are completely identical but are sent to different receivers) from 1103 is switched to the bus over a gate. The oACK(½) signals from 1103 are negated in the BM UNIT (1101) and sent to the inverting open collector bus driver (1104). The bus is pulled to H over resistors (1105). The BM UNIT is switched so that the following cases occur:

1. If the corresponding bus is not driven by the BM UNIT, L is at the base of the transistors (1104). Therefore, they place no load on the bus.
2. If the corresponding bus is driven by the BM UNIT and the signal is not acknowledged, the base of the transistors (1104) is at H. This means that the bus is pulled to L. If a result is distributed to multiple data receivers by broadcasting, then all PAEs that have not yet acknowledged the result data and need waiting cycles pull the bus to L.
3. If the corresponding bus is driven by the BM UNIT and the signal is acknowledged, the base of the transistors (1104) is at L. This means that the bus is not placed under load. If a result is distributed to multiple data receivers by broadcasting, all PAEs which have acknowledged the result data and do not need waiting cycles place no load on the bus.

In its initial state, the bus assumes the H level, i.e., acknowledgment, so non-acknowledgment according to case 2 overrides the acknowledgment by pulling the bus to L. The bus goes to the H level, i.e., the acknowledgment state, only when all PAEs acknowledge the result data. Thus, a wired-AND circuit is implemented. The sync state machine supplies the RUN signal (1107) to the SM UNIT (1106) which is running on the basis of RUN. If the SM UNIT is in the last—or only processing cycle—it signals this to the sync state machine via FINISH (1108). FINISH is analyzed in the analysis units to recognize the last cycle (0907, 0915). The SM UNIT runs in sync with the PAE-internal clock CLK.

Figure 12:
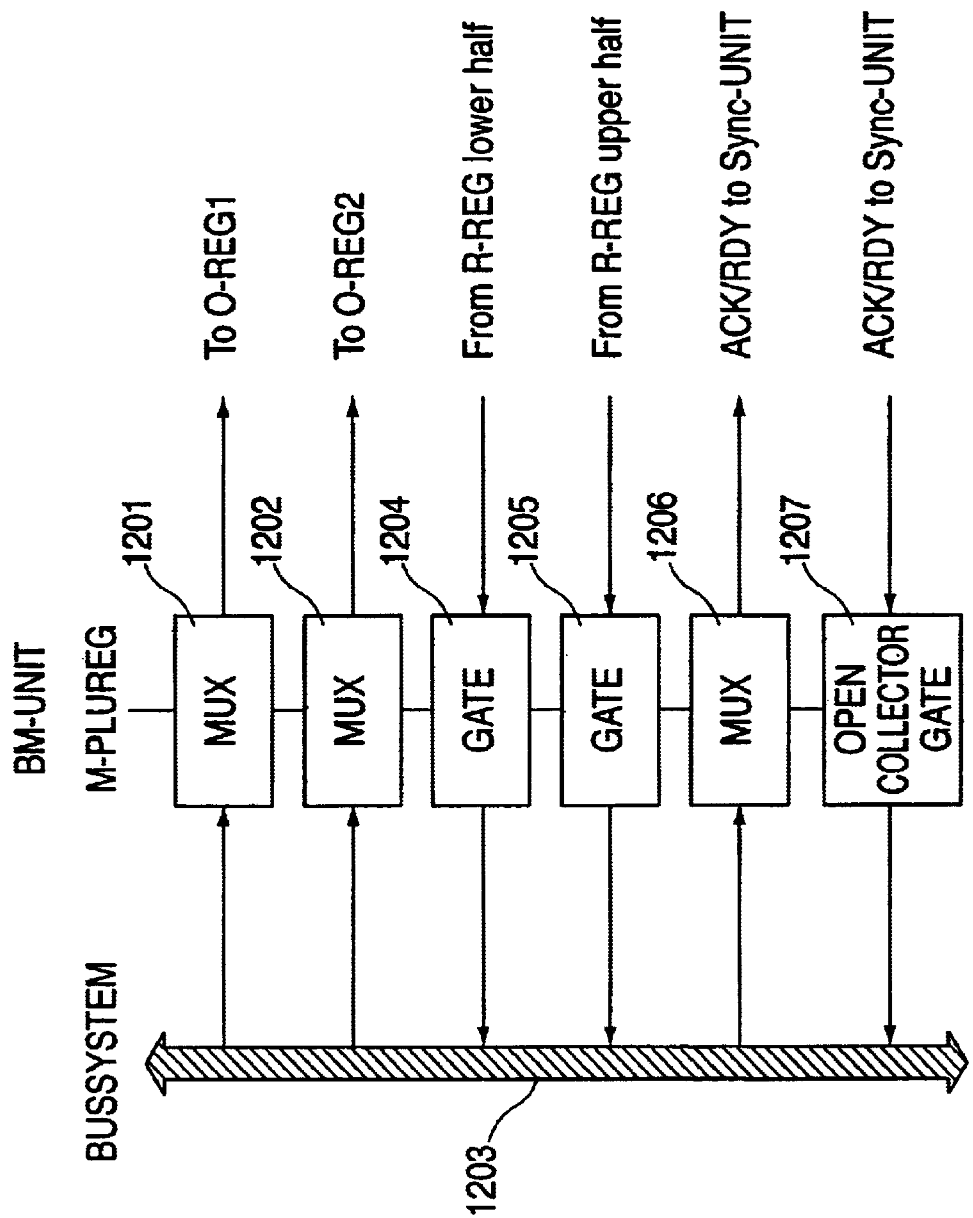
FIG. 12 shows an example architecture of a BM UNIT.

FIG. 12 shows the architecture of the BM UNIT. Depending on the entries into M-PLUREG, the multiplexers (1201, 1202) switch the operands from the internal bus (1203) to O-REG. Likewise, the gates (1204, 1205) switch the upper and lower halves of the result to the bus.

Multiplexer 1206 switches oRDY(½) according to the position of 1201 and 1202 and switches rACK according to the position of 1204 and 1205 from the bus to the PAE. The rACK signals of the two data receivers are linked together by AND. If there is only one data receiver, the multiplexer is switched so that it returns a logic 1 instead of the missing rACK. 1207 contains a gate for switching the oACK(½) and rRDY signals to the bus. The oACK(½) signals are first inverted and then switched to the bus over the open collector driver (1104).

Figure 13:
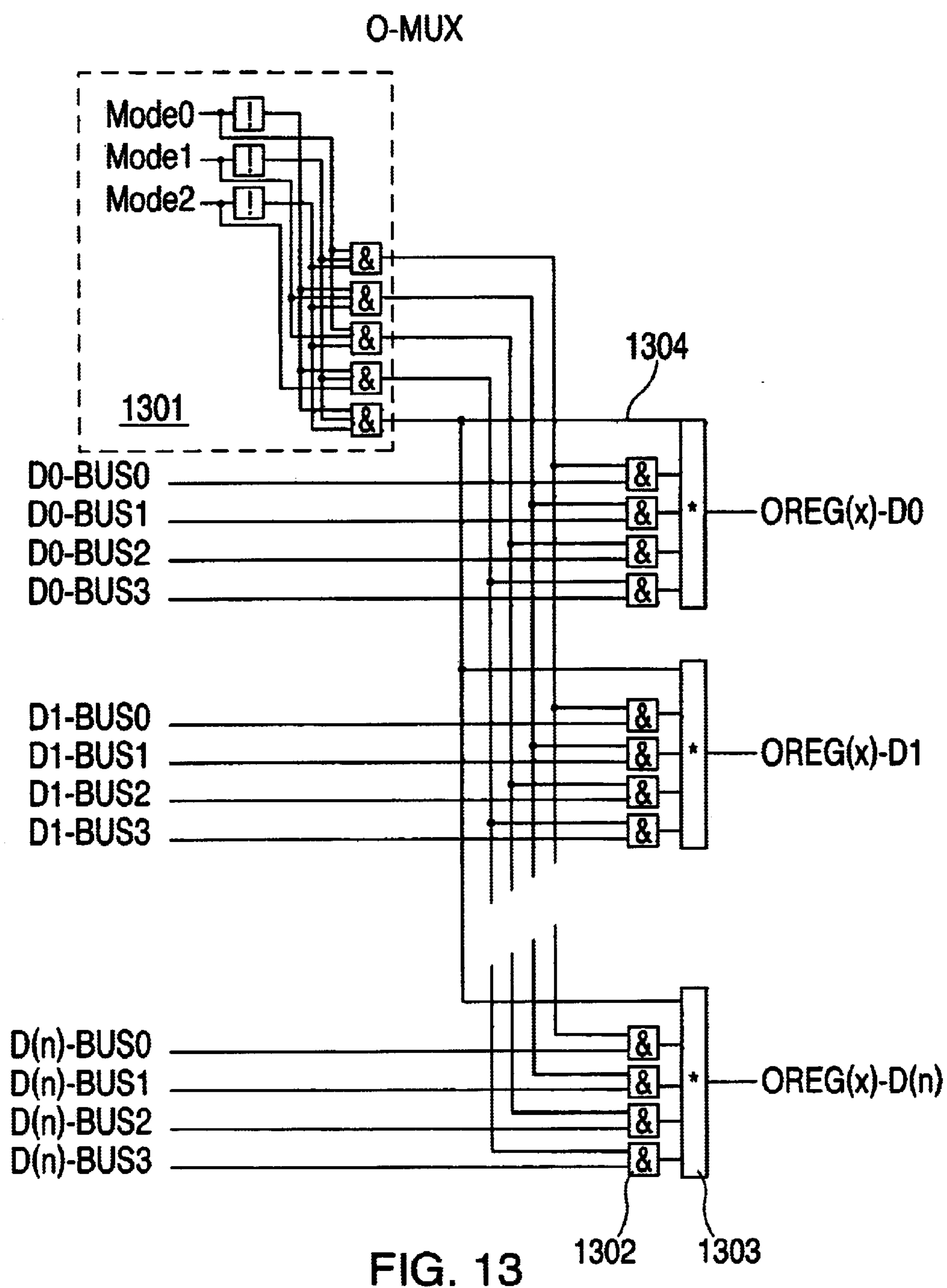
FIG. 13 shows an example architecture of an O-MUX, limited to four bus systems.

FIG. 13 illustrates the architecture of an O-MUX. There is a 3:5 decoder (1301) for analyzing mode 2–0 signals from M-PLUREG. The multiplexer is constructed with AND gates (1302) and a downstream OR gate (1303). The analysis signal of mode 2–0=000 of the decoder (1301) is switched directly to the OR gate (1304). This causes logic 1 to always be returned in the open state, i.e., no connection to a bus system (see rACK in FIG. 12). Only a reduced bus size is shown for the sake of simplicity.

Figure 14:
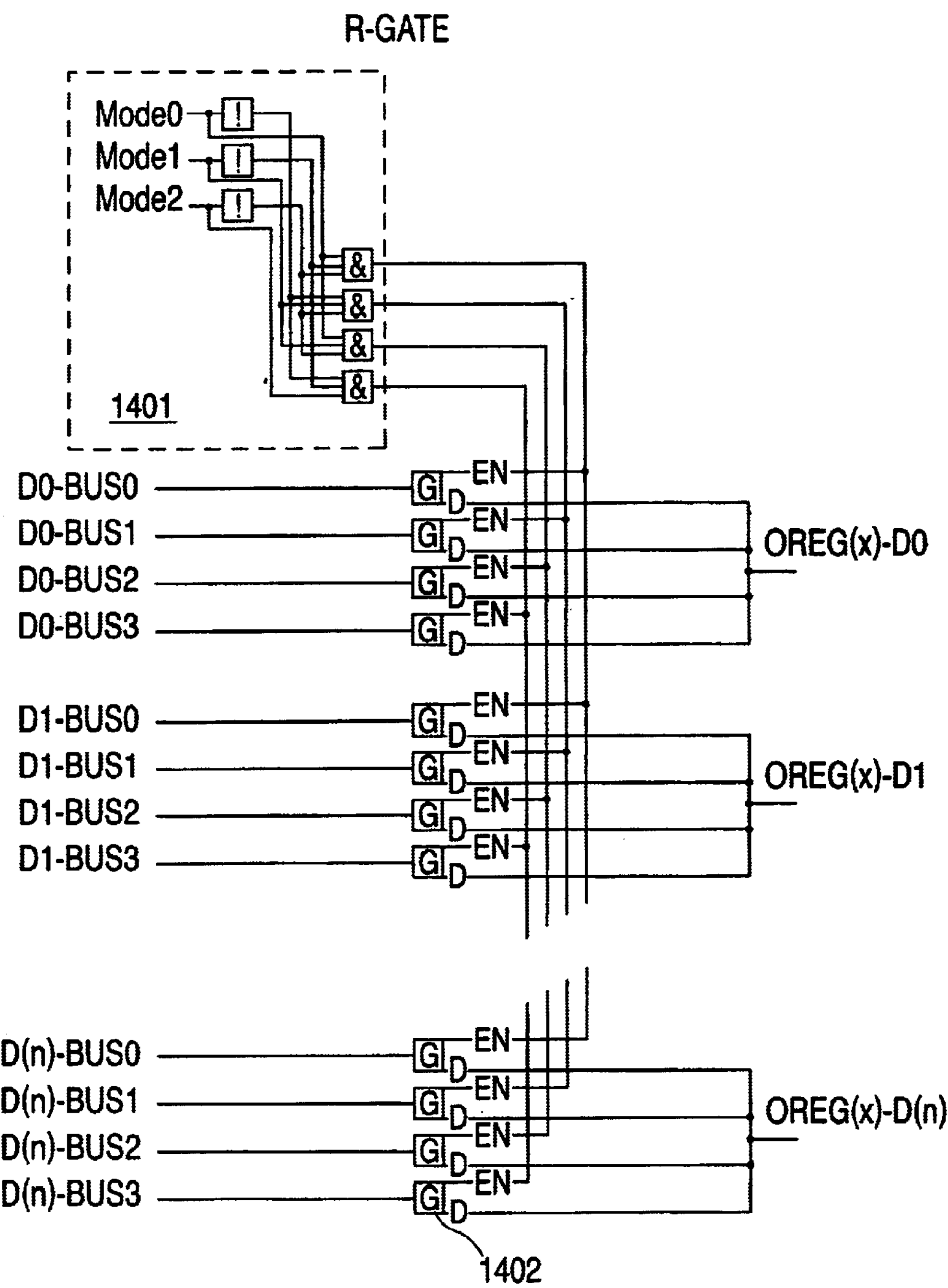
FIG. 14 shows an example architecture of an R GATE, limited to four bus systems.

FIG. 14 shows the architecture of an R GATE. There is a 3:4 decoder (1401) for analyzing mode 2–0 signals from M-PLUREG. The analysis signal of mode 2–0=000 of the decoder is not used. Therefore, no bus connection is established with this bit combination. The gates (1402) are composed either of AND gates or transmission gates (see 0701). An amplifier stage for driving the bus load is connected upstream or downstream. Only a reduced bus size is shown for the sake of simplicity.

Figure 15:
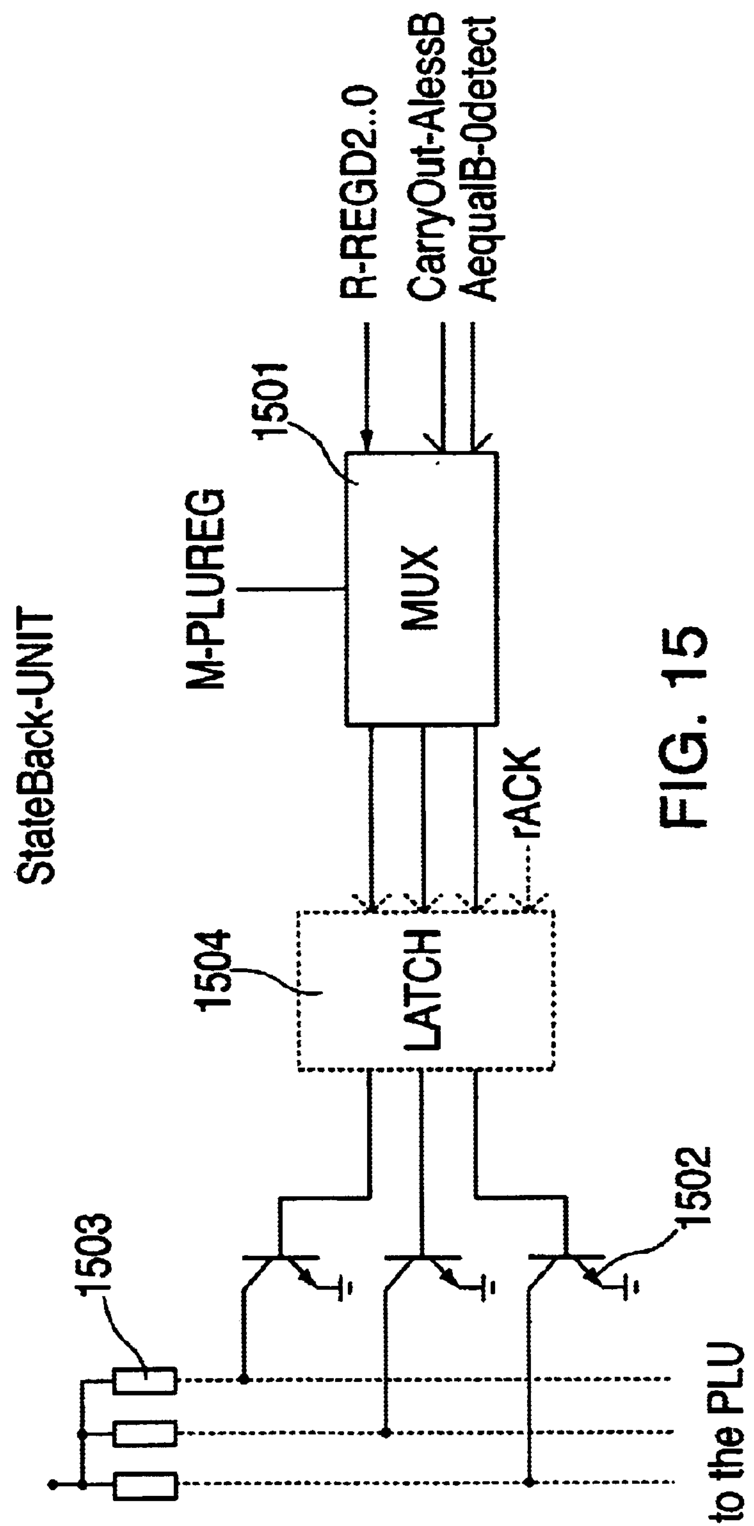
FIG. 15 shows an example architecture of the state-back UNIT.

FIG. 15 shows the state-back UNIT. Depending on the setting in M-PLUREG, a multiplexer (1501) switches through either the signals CarryOut-AlessB, AequalB-Odetect from the EALU or the outputs of R-REG R-REGD2–0. The signals go to an open collector transistor stage (1502) and are switched to the PLU bus. The PLU bus needs external pull-up resistors (1503) positioned near the PLU. Latch 1504 is optional. If it is inserted into the output signals of 1501, they are switched to the bus (1503) only after the data receiver has acknowledged the data via rACK. Consequently, the readiness for reconfiguration is indicated by the status signals only when the data have been accepted. This is normally regulated by the interaction of STOP and ReConfig in the sync UNIT. Therefore, the latch is optional. The rACK signal is used as the latch clock pulse. The latch is transparent at rACK=1 and saved at rACK=0.

Figure 16:
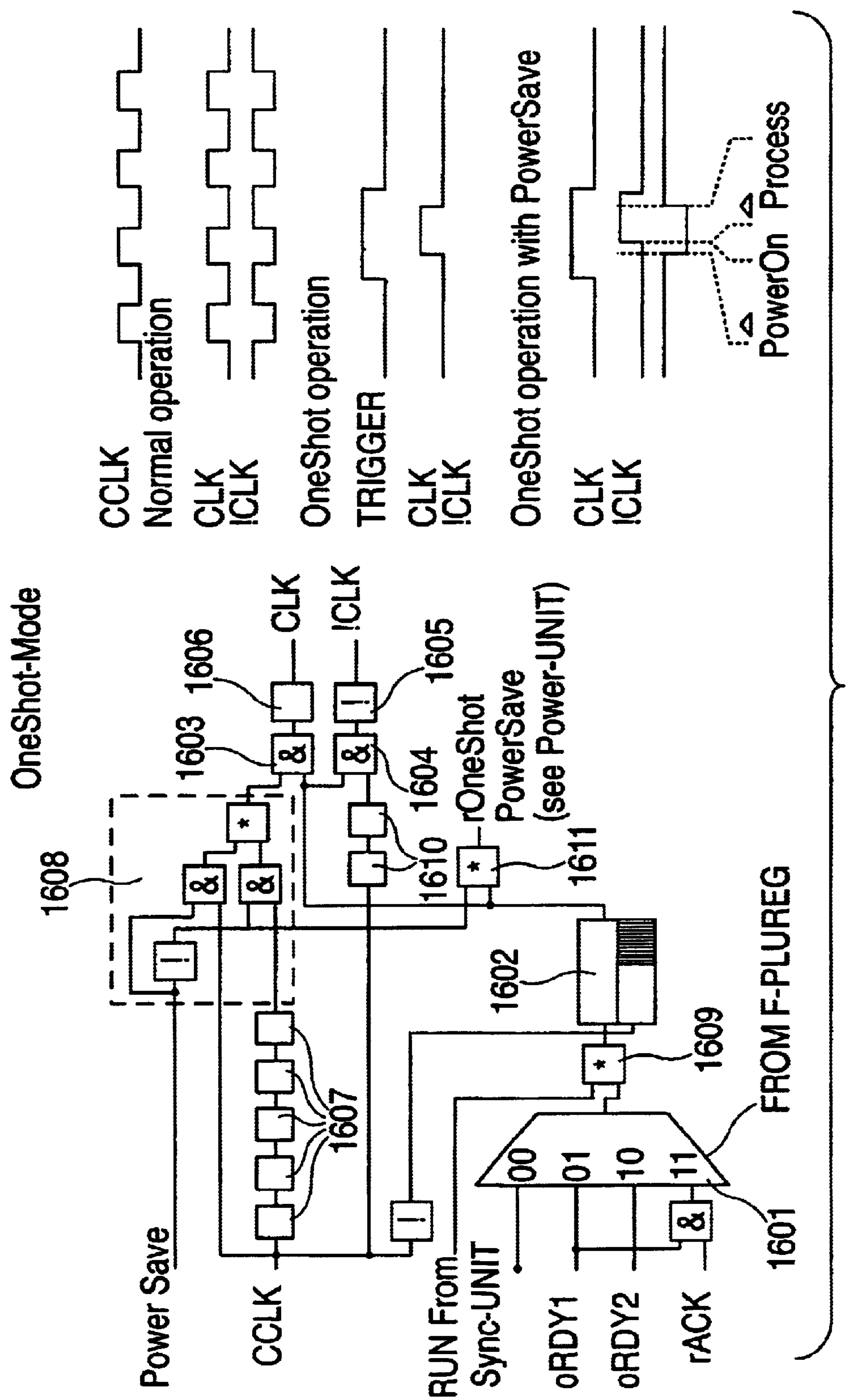
FIG. 16 shows an exemplary operating principle of the one-shot MODE and the one-shot/power-save MODE.

FIG. 16 illustrates the operation of the one-shot MODE. The signals

1. Vcc
2. oRDY1
3. oRDY2
4. (oRDY1 & rACK)

enable the cell clock via a multiplexer (1601) depending on the setting in F-PLUREG. The effect of the enable via Vcc is that the clock is always running (see "normal operation" in the timing diagram).

In the three remaining modes, the clock does not run until the signals or signal combinations enable the clock. The enable is synchronized to clock CCLK by a latch (1602), so the phase is not aborted prematurely when the enable signal is too short. The latch is transparent in the L phase of CCLK and holds its value in the H phase. The enable signal goes to the AND gate pair (1603and 1604) which enables the clock. Inverted clock signal !CLK is generated by an inverter (1605); CLK runs through a time-delay element (1606) to guarantee phase coincidence (see "one-shot operation" in the timing diagram). CCLK is delayed over two delay pulses (1610) in the incoming line to 1604 to guarantee phase coincidence with CCLK which is applied to 1603 and has been delayed by the multiplexer (1608). If a PAE is brought into the power-save mode, the power supply of the cell is mostly shut down. This is done via OR gate 1611, If the power-save MODE has been activated, i.e., power save=1, the negated signal carries an L level. If one-shot MODE has also been switched on and register 1602 is at L, the power supply transistor in the power UNIT (see FIG. 17) is also switched off via the one-shot power-save signal. However, if register 1602 is at logic 1 (or power save=0), the power supply transistor is switched on via 1611.

The following table gives an overview of the function:

| Power save | Latch (1602) | Voltage | Comments |
|---|---|---|---|
| L | X | on | |
| H | L | off | only when one-shot MODE has been set! |
| H | H | on | |

When switching on the power supply, there is a wake-up time of fixed duration until the cell is capable of functioning. To nevertheless function properly, the signals must be delayed accordingly. Therefore, CCLK is sent over a delay line (1607). A multiplexer (1608) selects according to the power-save signal from F-PLUREG whether the normal or delayed clock pulse is sent to the cell. Only the uninverted clock pulse is delayed by the Δpower-on period; the inverted clock pulse is not delayed. Therefore, the result is available in synchronization with the remaining functions of the unit. Thus, the usable processing time is reduced to Δprocess. The maximum clock frequency of the unit thus depends on Δpower-on+cprocess (see "one-shot operation with power save" in the timing diagram).

Figure 17:
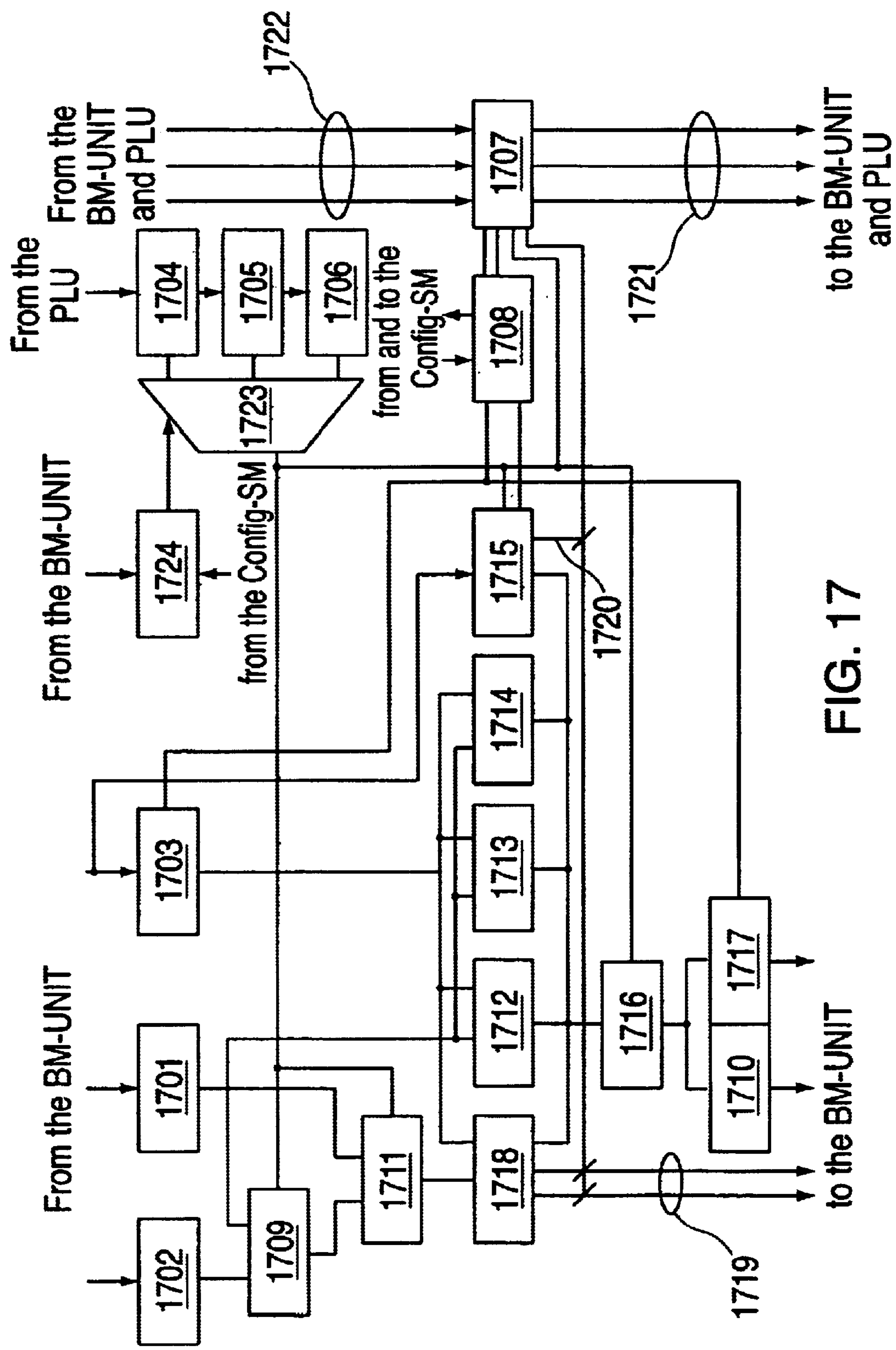
FIG. 17 shows an example of implementation of a PAE.

FIG. 17 shows an example of implementation of a PAE. The BM unit, the power unit, the StateBack unit, the PLU bus and the M-PLUREG are not shown.

The PAE has three input registers oREG1 (1701), oREG2 (1702), oREG3 (1703) for the data to be processed. The input registers receive their data from preceding PAEs via the BM unit. All the input registers are registers without a shift function.

The F-PLUREGs (1704, 1705, 1706) determine a plurality of configurations of the PAEs. They are loaded by the PLU over the PLU bus. A configuration selected via the multiplexer (1723) is stored in each F-PLUREG. The multiplexer (1723) is controlled by the register (1724). The register (1724) receives data or triggers from a preceding PAE through the BM unit. This PAE is not identical to the PAEs which supply the data for the input registers. Of course, a larger or smaller number of F-PLUREGs is also conceivable.

The third input register oREG3 (1703) supplies the operand for a multiply-add function, where the contents of the oREG1 (1701) are multiplied by the contents of the oREG2 (1702) in the multiplier (1709) and then the contents of the oREG3 (1703) are added in the adder/comparator (1718). The adder/comparator is configured so that it performs an addition. If only multiplication is to be performed, the oREG3 (1703) is loaded with the value zero. If only addition is to be performed, the F-PLUREG switches the multiplexer (1711). Thus, the value of the oREG1 (1701) goes directly to the adder/comparator (1718). The second function of the adder/comparator (1718) takes the value of the oREG1 (1701) and the value of oREG3 (1703) and compares the two values. The output signals CarryOut-AlessB and AequalB-0detect (1719) indicate whether the two values are the same or the value of oREG3 (1703) is greater or less than the value of oREG1 (1701).

Additional functions implemented in the PAE include a shift register (1712), a divider (1713), logic functions (1714) and AND, OR, NOT and a counter (1715). The counter (1715) generates a trigger signal (1720) as soon as it has counted from a predetermined value to zero. The counter (1715) is loaded directly with the value also received by oREG3 (1703). It is also conceivable to use other counters, such as incremental counters which count from zero to a loaded value and then generate a trigger signal.

The results of the function units are relayed by the multiplexer (1716) to the two output registers rREG1 (1710) and rREG2 (1702) which are connected to the BM unit and thus relay the data to the downstream PAEs. The sequence is controlled by a sync unit (1708) connected to the trigger logic (1707). In addition, it exchanges control signals with the config state machine, guaranteeing the correct sequence when the configuration is changed by the multiplexer (1711). The trigger logic (1707) is connected to the F-PLUREG and analyzes the incoming signals (1722) in accordance with the configuration stored in the F-PLUREGs. The incoming signals include the ReConfig, the general trigger signal as well as the handshake signals ORDY and rACK. Depending on the configuration, the trigger logic (1707) delivers the handshake signals to the sync unit (1708), which in turn generates the enable signals for the input and output registers and the counter. In addition, the sync unit (1708) generates outgoing handshake signals OACK and rRDY, relaying them to the trigger logic (1707). Depending on the configuration, the signals (1719) or the trigger of the counter (1720) can be used as a general trigger signal and sent to the trigger logic (1707). The signals (1721) ReConfig, handshake signals ORDY and rACK and the general trigger signal are outgoing from the trigger logic (1707) and sent to the BM unit.

Figure 18:
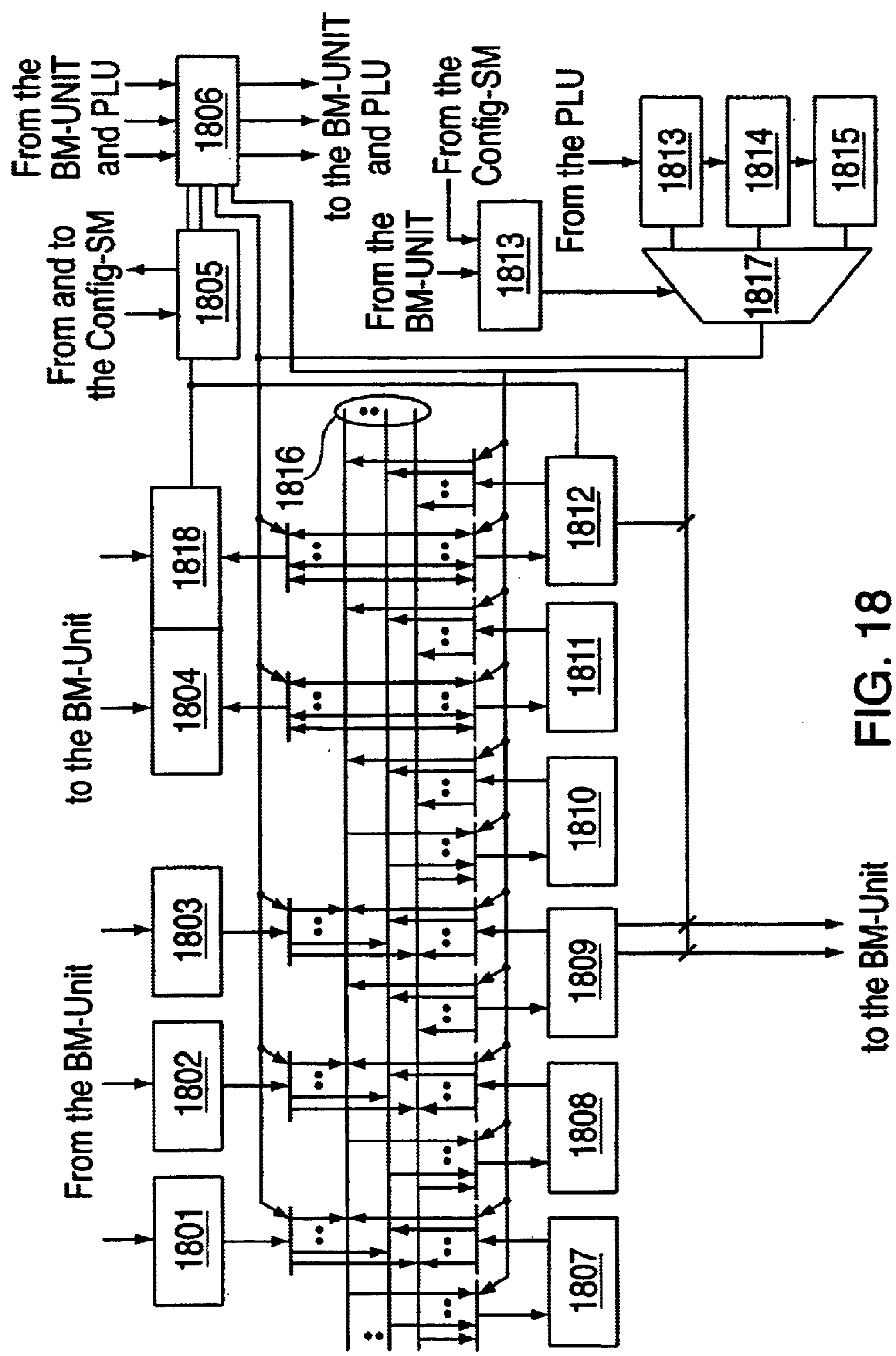
FIG. 18 shows an example architecture of a PAE, with the individual functions being linked via a bus system.

FIG. 18 shows a PAE with the same extent of functions as the PAE in FIG. 17. Here again, the BM unit, the power unit, the StateBack unit and the M-PLUREG are not shown. It has three input registers oREG1 (1801), oREG2 (1802), oREG3 (1803), two output registers rREG1 (1804), rREG2 (1818), three F-PLUREGs (1813, 1814, 1815), a multiplexer (1817), one sync unit (1805) and one trigger logic (1806). The function units include a divider (1807), a multiplier (1817), an adder/comparator (1809), logic functions (1810), a shift register (1811) and a counter (1812). The function of the individual units corresponds to that described with regard to FIG. 17. It is also conceivable to have additional functions integrated into the PAE, such as the trigonometric functions, root and exponential functions. This is of course also true of the PAE described with regard to FIG. 17. The individual functions can be implemented as integers or as floating point units. In contrast with the PAE in FIG. 17, the individual function units are linked by a bus system (1816), so that the individual functions can be interconnected in any sequence. The wiring is determined by the configuration stored in the F-PLUREGs. The bus system (1816) may have different designs. Possibilities include one or more segmented buses whose segments connect two functions that are wired together or a number of continuous buses wiring two function units together. In addition, there is the possibility of the individual functions and registers sending a target address with the help of which a connection is established.

Figure 19:
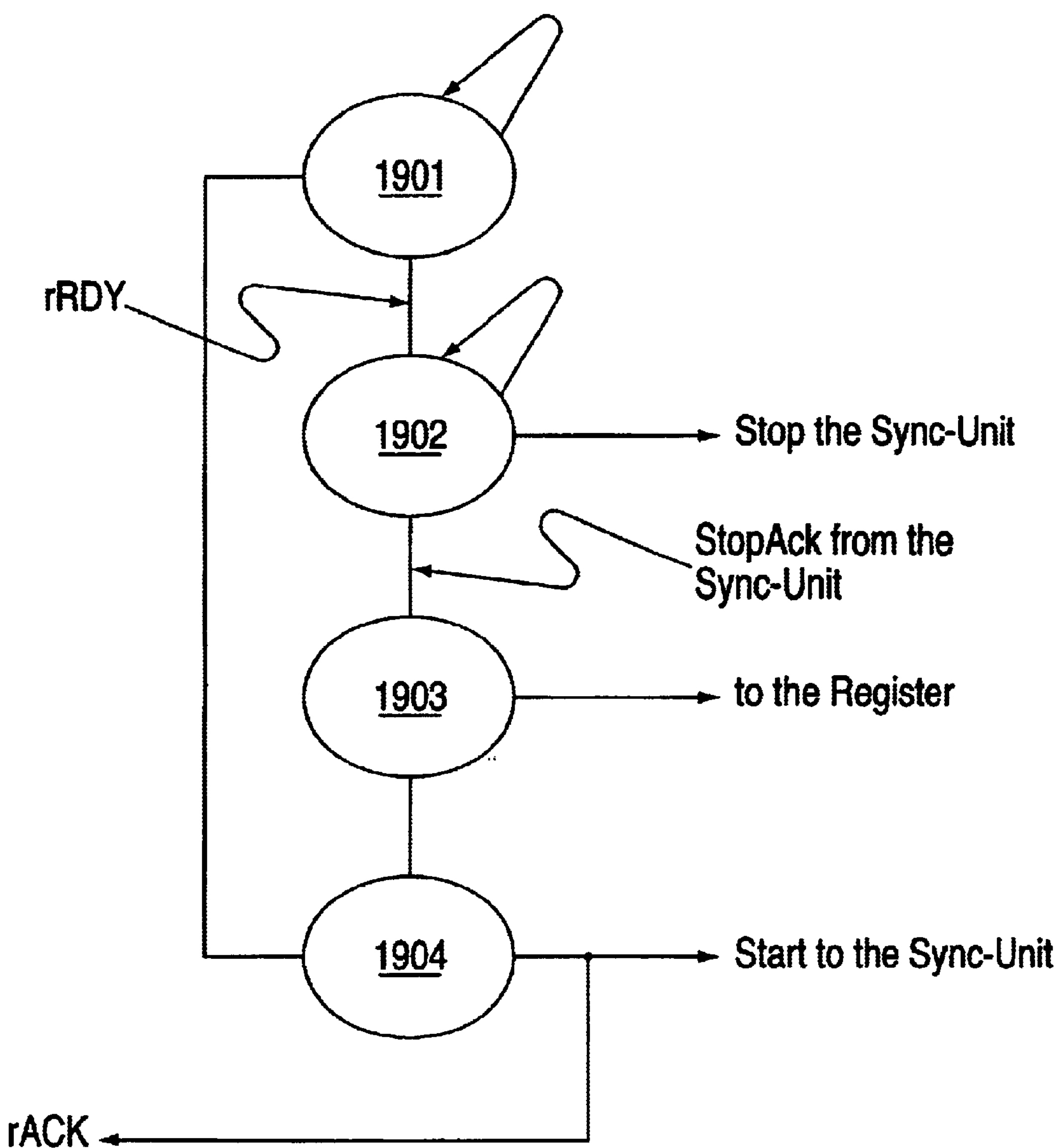
FIG. 19 shows an example operation of the config state machine.

FIG. 19 shows a config state machine which manages the configuration registers. At the start, the config state machine is in the IDLE state (1901). This state is not left until after a rRDY signal has been received from the config PAE selecting the configuration register. Then the config state machine enters the stop state (1902) and transmits a stop signal to the sync unit of the PAE. The PAE terminates its operation at the next possible time, sending a stop acknowledge signal to the config state machine. The latter goes into the reload state (1903) and transmits an enable signal to the register of the config PAE. Then the config state machine changes into the restart state (1904), sends a start signal to the sync unit, which resumes its processing. At the same time, it sends an rACK signal to the config PAE. Finally, the config state machine returns to the IDLE state (1901).

Figure 20:
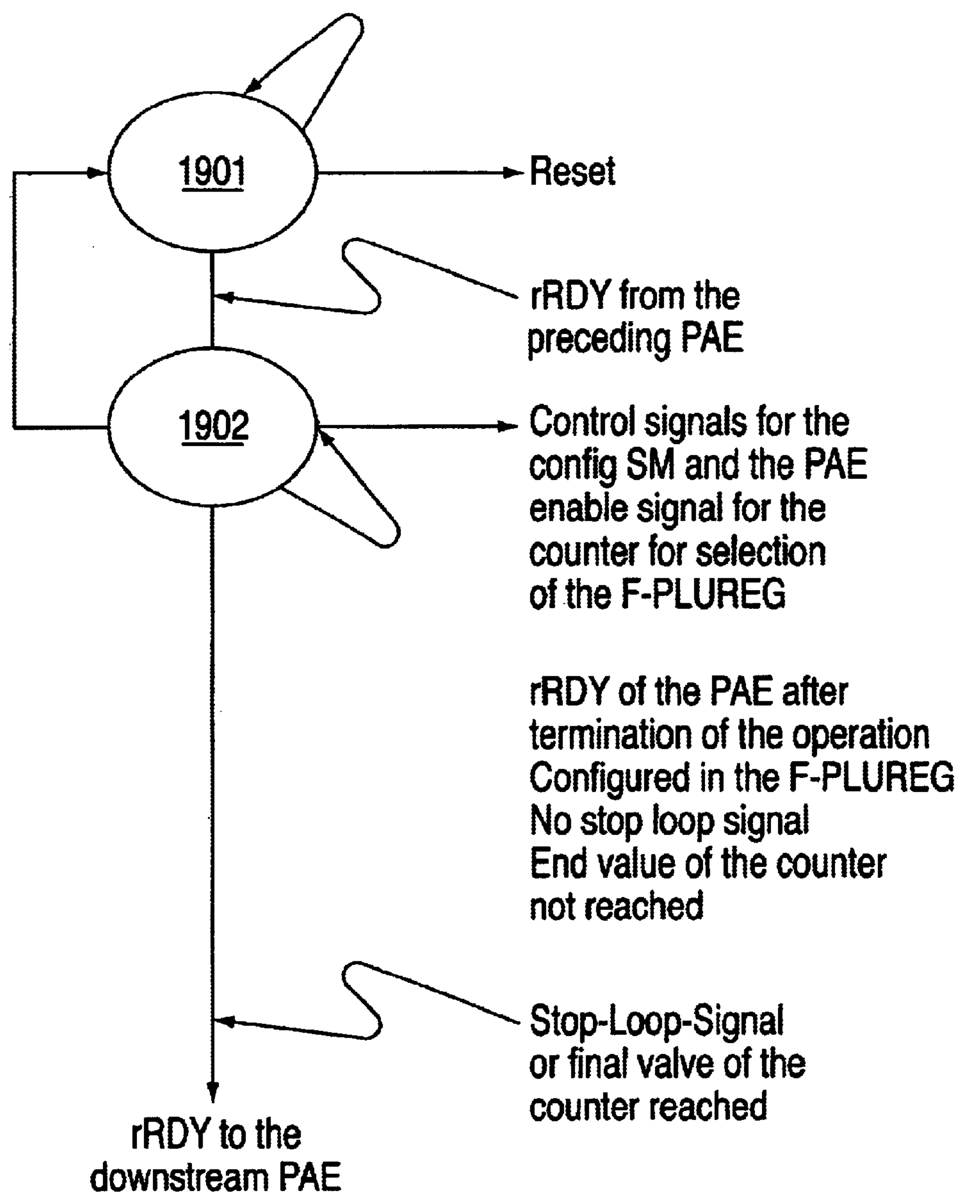
FIG. 20 shows an example operation of a loop state machine.

FIG. 20 shows a state machine for automatically running through the various configurations of the PAE, which is referred to below as a loop state machine. Since there are several F-PLUREGs, it is appropriate under some circumstances to perform multiple operations in succession and only then relay the data as well as the trigger signals and handshake signals to the downstream PAE.

The result of the individual operations is returned from the rREG of the PAE to the input registers via the feedback described above. This process can be controlled by an external stop loop signal or an internal counter.

At the beginning, the loop state machine is in the IDLE state (2001). In the IDLE state (2001) the loop state machine delivers a reset signal to a counter. This counter is used to dial the F-PLUREG. After the rRDY of the preceding PAE, the loop state machine enters the configuration state (2002), where it generates the handshake signals for the PAE and the control signals for the config state machine. In addition, an enable signal is generated for the counter, whose value is incremented by one. If the loop state machine then does not receive any stop loop signal or if the internal counter of the PAE has not yet reached its final value, it remains in the configuration state (2002), and the sequence described above is repeated. On arrival of a stop loop signal or when the internal counter of the PAE has reached its final value, the state machine returns to the IDLE state (2001) and the rRDY signal is relayed to the next PAE.

Figure 21:
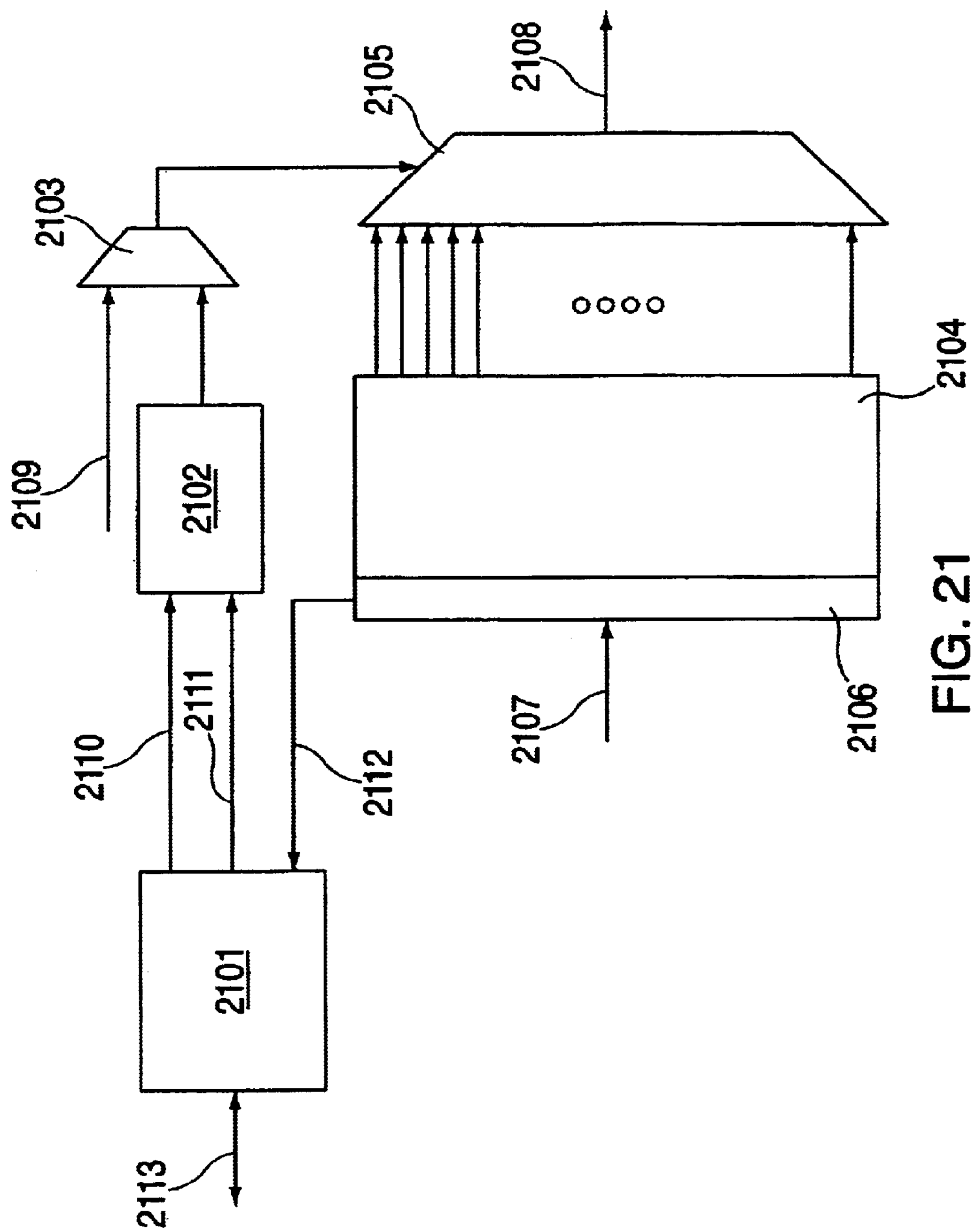
FIG. 21 shows an example cyclical processing of the configuration register data.

FIG. 21 illustrates the part of the PAE needed for the sequential run-through of the configurations stored in the F-PLUREG. The F-PLUREGs (2104) receive their data from the PLU (2107) and are slightly modified in comparison with the embodiments described previously. Each F-PLUREG contains an additional bit, the loop bit (2106). This loop bit is returned to the loop state machine (2102) described with regard to FIG. 20 through the link (2112). It functions there as a stop loop signal, i.e., with the loop bit (2106) set, the loop sequence is terminated; otherwise, it is continued until the loop stop bit is set, or the internal counter of the loop state machine (2101) described in conjunction with FIG. 20 has reached its final value. The loop state machine (2101) controls the counter (2102) whose value controls the selection of the F-PLUREG (2104) by the multiplexer (2105). The control signals of the config state machine and the handshake signals of the PAE are transmitted through the link (2113). The configuration data of the F-PLUREG is relayed over the link (2108) to the function units of the PAE.

The counter (2102) receives an enable signal (2110) so that the value of the counter (2102) is incremented. In addition, the loop state machine (2101) sends a reset signal (2111) to the counter as soon as a loop operation is concluded. A choice can be made between loop mode and the normal process in the PAE by way of the multiplexer (2103). In a normal sequence, the multiplexer (2103) relays a data (2109) for selection of an F-PLUREG (2104) to the multiplexer (2105).

DEFINITION OF TERMS

AequalB-0detect: Signal generated by the EALU, indicating in arithmetic operations that the result is equal to zero. In comparisons, it indicates that operand A is equal to operand B.

ALU: Arithmetic and logic unit. Basic unit for processing data. The unit can perform arithmetic operations such as addition, subtraction or under some circumstances also multiplication, division, series expansions, etc. The unit may be designed as an integer unit or as a floating point unit. It may also perform logic operations such as AND, OR and comparisons.

BM UNIT: Unit for connecting the data to the bus systems outside the PAE. The connection takes place via multiplexers for the data inputs and gates for the data outputs. OACK lines are implemented as open collector drivers. The BM UNIT is controlled by M-PLUREG.

Broadcast: Transmitting data from a PAE to multiple data receivers.

CarryOut-AlessB: Signal generated by the EALU which indicates a carry-over in arithmetic operations. In comparisons, it indicates that operand A is smaller than operand B.

Data receiver: The unit(s) which processes further the results of the PAE.

Data transmitter: The unit(s) which makes available the data for the PAE as operands.

D flip-flop: Storage element that stores a signal at the rising edge of a clock pulse.

EALU: Expanded arithmetic and logic unit. An ALU expanded to add special functions which are needed or appropriate for the operation of a data processing system according to German Patent No. 44 16 881. These are counters in particular.

FPGA: Known field-programmable gate array.

F-PLUREG: Register in which the function of the PAE is set. The one-shot and sleep modes are also set here. The PLU writes into the register.

Gate: Group of transistors that perform a basic logic function. Basic functions include, for example, NAND, NOR. Transmission gates.

H level: Logic 1 level, depending on the technology used.

Handshake: Signal protocol in which one signal A indicates a state and another signal B confirms that it accepts signal A and responds (has responded) to it.

Configuring: Determining the function and interconnecting a logic unit, a (FPGA) cell or a PAE (see reconfiguring).

Latch: Storage element which normally relays a signal transparently during the H level and stores it during the L level. Latches where the function of the levels is exactly reversed are occasionally used in PAEs, in which case an inverter is connected upstream from the clock of a conventional latch.

L level: Logic 0 level, depending on the technology used.

M-PLUREG: Register in which the interconnection of the PAE is set. The PLU writes into the register.

Next-neighbor interconnection: Interconnection of bus systems with the adjacent neighbors abutting at the edges.

O-MUX: Multiplexer within the BM UNIT which selects the bus system of the operands.

One shot: Mode in which a PAE operates at a lower clock rate than the processor clock rate. The clock rate is synchronous with the processor clock rate and corresponds to one period. There is no phase shift. The clock pulse is enabled by one of the signals oRDY(½) or rRDY. This mode serves to save power when the data transmitters or receivers are transmitting or receiving data at a slower rate than the processor clock rate.

Open collector: Circuitry in which a bus signal pulled to the H level via a pull-up is applied to the collector of a transistor. The emitter of the transistor is grounded. If the transistor switches, the bus signal is pulled to the L level. The advantage of this method is that a plurality of such transistors can control the bus without electrical collision. The signals are OR linked, resulting in wired-OR.

O-REG: Operand register for storing the operands of the EALU. It makes it possible for the PAE to be independent of the data transmitters in time and function. This simplifies data transfer because it can be asynchronous or packet-oriented. At the same time, the possibility of reconfiguring the data transmitters independently of the PAEs or reconfiguring the PAEs independently of the data transmitters is created.

O-REGsft: O-REG with a shift register controlled by the SM UNIT.

PA: Processing array: array of PAEs.

PAE: Processing array element: EALU with O-REG, R-REG, R2O-MUX, F-PLUREG, M-PLUREG, BM UNIT, SM UNIT, sync UNIT, state-back UNIT and power UNIT.

PLU: Unit for configuring and reconfiguring the PAW. Configured by a microcontroller adapted specifically to its task.

Power-save MODE: Power-saving mode within the one-shot MODE. None of the parts of the PAE except the F-PLUREG, M-PLUREG and sync unit are supplied with voltage when no operation is being carried out.

Power Unit: Unit which regulates the power-saving functions.

Pull-down: Resistor which pulls a bus line to an L level.

Pull-up: Resistor which pulls a bus line to an H level.

R GATE: Switch within the BM UNIT which switches the result to the corresponding bus system. Some signals are switched over open collector drivers. The R GATE works as a bus driver and can enter a bus-neutral mode.

R2O-MUX: Multiplexer for inserting the result in an R-REGsft into the data path between O-REG and EALU.

R-REGsft: Result register for storing the result of the EALU. It makes it possible for the PAE to be independent, in time and function, of the data receivers. This simplifies data transfer because it can be asynchronous or packet-oriented. At the same time, this creates the possibility of reconfiguring the data receivers independently of the PAE or reconfiguring the PAE independently of the data receivers. The register is provided with a shift function which is controlled by the SM UNIT.

Serial operations: Operations performed by serial processing of a data word or an algorithm. Serial multiplication, serial division, series expansion.

Sleep MODE: Power-saving mode in which the PAE, except for F-PLUREG, carries no voltage.

SM UNIT: State machine UNIT. State machine which controls the EALU.

StateBack UNIT: Unit which controls the feedback of the status signals to the PLU. Consists of a multiplexer and an open collector bus driver stage.

Sync UNIT: Unit responsible for the synchronization of the PAE with the data transmitters and receivers, which also monitors the reconfiguration of PAEs. At the same time, it assumes the one-shot functions.

Gate: Switch that forwards or blocks a signal. Simple comparison: relay.

Reconfiguring: New configuration of any number of PAEs while any remaining PAEs continue with the same function (see configuring).

State machine: Logic which can assume various states. The transitions between the states depend on various input parameters. These are known machines that are used to control complex functions.

CinventionS

Naming conventions

Component: UNIT ating mode: MODE

Multiplexer: MUX

Negated signal: not

Visible register for PLU: PLUREG

Internal register: REG

Shift registers: sft
Function Conventions
Shift registers: sft
AND function: &

| A | B | Q |
|---|---|---|
| 0 | 0 | 0 |
| 0 | 1 | 0 |
| 1 | 0 | 0 |
| 1 | 1 | 1 |

OR function: #

| A | B | Q |
|---|---|---|
| 0 | 0 | 0 |
| 0 | 1 | 1 |
| 1 | 0 | 1 |
| 1 | 1 | 1 |

NOT function:!

| A | Q |
|---|---|
| 0 | 1 |
| 1 | 0 |

GATE funct ion: G

| EN | D | Q |
|---|---|---|
| 0 | 0 | — |
| 0 | 1 | — |
| 1 | 0 | 0 |
| 1 | 1 | 1 |

What is claimed is:

1. A directly addressable configurable unit that can be reconfigured at run time controlled by a primary logic unit (PLU) for processing arithmetic and logic operations (PAE) for use in central processing units (CPUs), multi-processor systems, data flow processors (DFPs), digital signal processors (DSPs), systolic processors and field programmable gate arrays (FPGAs), characterized in that a. a programmable arithmetic and logic unit (EALU) is provided for performing the basic mathematical and logic functions, b. the function and interconnection of the central processor are programmed in directly addressable registers and various data can be processed without reprogramming the PAE, c. there is a state machine (SM UNIT) for controlling the arithmetic and logic unit (EALU), d. registers are provided for each operand (O-REG) and the result (R-REG), some of the registers being designed as shift registers, e. there is feedback of the data of the result register to an input of the EALU over a multiplexer (R2O-MUX), f. a bus unit (BM UNIT) permits pick-up of data from a bus system and feeding the result to a bus system, the bus unit being capable of sending data to multiple receivers and the synchronization of multiple receivers taking place automatically, g. the bus access from the data processing in the EALU is decoupled via the registers and thus each PAE can be regarded as an independent unit, in particular the configuration and reconfiguration of a PAE have no interfering effect on the data transmitters and receivers or on the independent PAEs, h. the sequence of bus transfers is controlled automatically using a state machine (sync UNIT), for which purpose handshake lines oRDY, oACK, rRDY and rACK are available, and i. feedback is sent to the PLU for detection of the processing status and reconfigurability of the PAE (state-back UNIT).

2. The unit according to claim 1, characterized in that the data processing of a PAE can be stopped (STOP entry in F-PLUREG) and the PAE then indicates its readiness for reconfiguration (ReConfig) after completing the data processing currently underway.

3. The unit according to claim 1, characterized in that there are power-saving modes a) in which the PAE always operates only when operands from the data transmitter are available at the input and the result has already been accepted by the receiver, and the PAE otherwise remains inactive without a clock pulse, b) in which partial areas of the PAE which are irrelevant for the execution of the data processing currently underway are separated from the clock pulse supply and/or the power supply, in which the PAE is separated from the power supply.

4. A circuit, comprising:

a plurality of coarse grained processing array elements;

a primary logic unit communicatively coupled to the processing array elements; and an internal bus system;

wherein each of the processing array elements is reconfigurable at a run time without effecting other processing array elements and without effecting data streams communicated between transmitters and receivers, by selecting one of a set of predefined, non-alterable instructions according to configuration data sent from the primary logic unit and addressed to the processing array element, and each of the processing array elements is decoupled from the internal bus system.

5. The circuit according to claim 4, wherein each of the processing array elements includes an EALU configured to perform mathematical and logical functions.

6. The circuit according to claim 5, wherein the EALU produces a result by performing the mathematical and logical functions on at least one operand.

7. The circuit according to claim 6, wherein each of the processing array elements is configurable to route the result to the at least one operand.

8. The circuit according to claim 5, wherein respective registers are assigned to the at least one operand and the result, each of the processing array elements being decoupled from the internal bus system via the respective registers.

9. The circuit according to claim 5, wherein each of the processing array elements includes a state machine configured to control the EALU.

10. The circuit according to claim 9, wherein the state machine is configured to automatically control a sequence of bus transfers.

11. The circuit according to claim 10, wherein the state machine is configured to automatically control the sequence of bus transfers using at least one handshake signal.

12. The circuit according to claim 4, wherein each of the processing array elements includes at least one respective PLU register communicatively coupled to the primary logic unit, a function and an interconnection of each of the processing array elements being controlled by the at least one respective PLU register.

13. The circuit according to claim 4, wherein each of the processing array elements is configured to communicate at least one of a processing status and a reconfigurability to the primary logic unit.

14. The circuit according to claim 4, wherein each of the processing array elements is configured to indicate a reconfiguration readiness after being stopped.

15. The circuit according to claim 4, wherein each of the processing array elements includes a power unit configured to control a power consumption of a respective one of the processing array elements.

16. The circuit according to claim 15, wherein the power unit is configured to control the power consumption by implementing one of a plurality of power-save modes.

17. A reconfigurable data processor comprising: comprising:

a bus; and coarse grained reconfigurable processing array elements, each one of the processing array elements including:

a bus unit coupling the one of the processing array elements to the bus, input registers storing operands received over the bus via the bus unit from at least one upstream one of the processing array elements at least one configuration register storing configuration data indicating one of a set of predefined, non-alterable instructions, the at least one configuration register receiving the reconfiguration from at least one upstream one of the processing array elements;

a logic circuit performing operations of the operands in accordance with the configuration data, output registers storing result data received from the logic circuit, the result data being transmitted on the bus via the bus unit to at least one downstream one of the processing array elements; and at least one register coupling the logic circuit to the bus unit.

18. The reconfigurable data processor according to claim 17, wherein each one of the processing array elements further includes:

trigger logic receiving trigger signals over the bus via the bus unit; and a synchronizer unit connected to the trigger logic, the synchronizer synchronizing operation of the one of the processing array elements as a function of signals received from the trigger logic.

19. The reconfigurable data processor according to claim 17, wherein each one of the processing array elements further includes:

a multiplexer connected to the logic circuit and the output registers, the multiplexer relaying the result data from the logic circuit to the output registers.

* * * * *

UNITED STATES PATENT AND TRADEMARK OFFICE

CERTIFICATE OF CORRECTION

PATENT NO. : 6,728,871 B1
DATED : April 27, 2004
INVENTOR(S) : Vorbach et al.

It is certified that error appears in the above-identified patent and that said Letters Patent is hereby corrected as shown below:

Column 1,
Line 27, change "IVPUS" to -- VPUs --;

Column 4,
Line 54, 55, 61, 62 and 64, change "ORDY" to -- oRDY --;

Column 5,
Line 33, change "ORDY" to -- oRDY --;

Column 6,
Line 53, change "OACK" to -- oACK --;

Column 10,
Line 61, change "ORDY and OACK" to -- oRDY and oACK --

Column 14,
Lines 60 and 65, change "ORDY and OACK" to -- oRDY and oACK --;

Column 15,
Line 2, "ORDY and OACK" to -- oRDY and oACK --;

Column 16,
Line 53, "ORDY and OACK" to -- oRDY and oACK --;

Column 18,
Line 59, "CinventionS" to -- CONVENTIONS --.

Signed and Sealed this

Fourth Day of January, 2005

JON W. DUDAS
*Director of the United States Patent and Trademark Office*